United States Patent
Guo et al.

(10) Patent No.: US 11,734,138 B2
(45) Date of Patent: *Aug. 22, 2023

(54) HOT STANDBY METHOD, APPARATUS, AND SYSTEM

(71) Applicant: HUAWEI TECHNOLOGIES CO., LTD., Guangdong (CN)

(72) Inventors: Dayong Guo, Beijing (CN); Hongtao Guo, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,983

(22) Filed: Jul. 2, 2022

(65) Prior Publication Data
US 2022/0334935 A1 Oct. 20, 2022

Related U.S. Application Data

(63) Continuation of application No. 15/934,382, filed on Mar. 23, 2018, now Pat. No. 11,416,359, which is a (Continued)

(30) Foreign Application Priority Data

Sep. 24, 2015 (CN) .......................... 201510618629.7

(51) Int. Cl.
*G06F 11/00* (2006.01)
*G06F 11/20* (2006.01)
(Continued)

(52) U.S. Cl.
CPC ...... *G06F 11/2097* (2013.01); *G06F 11/2033* (2013.01); *H04L 41/0668* (2013.01);
(Continued)

(58) Field of Classification Search
CPC ............. G06F 11/2097; G06F 11/2033; H04L 67/1029; H04L 67/1034; H04L 69/40
See application file for complete search history.

(56) References Cited

U.S. PATENT DOCUMENTS

| 6,856,591 B1 | 2/2005 | Ma et al. |
| 6,865,655 B1 | 3/2005 | Andersen |

(Continued)

FOREIGN PATENT DOCUMENTS

| CN | 101126998 A | 2/2008 |
| CN | 101374316 A | 2/2009 |

(Continued)

OTHER PUBLICATIONS

Peng Zhu China Unicom P R CHINA:"Output-drafl new Recommendation Q.BNG-Pool Signalling requirements for BNG(Broadband Network Gateway) pool;TD 742 (GEN/11)", ITU-T Draft;Study Period 2013-2016, International Telecommunication Union, Geneva;CH, vol. 5/11, Apr. 27, 2015, XP044131555, 11 pages.

*Primary Examiner* — Loan L.T. Truong
(74) *Attorney, Agent, or Firm* — Womble Bond Dickinson (US) LLP

(57) ABSTRACT

Embodiments of the present disclosure provide a hot standby method, apparatus, and system. The method includes: saving, by an active device, first user information of the active device into a local cache module of the active device and sending, by the active device, the first user information to a remote cache module of a first standby device based on preset correlation information. In response to detecting that the active device becomes faulty, the first standby device obtains the first user information from the remote cache module of the first standby device and restores the first user information.

43 Claims, 5 Drawing Sheets

An active device saves first user information of the active device into a local cache module of the active device — S101

The active device sends the first user information to a remote cache module of a first standby device according to preset correlation information, so that when detecting that the active device becomes faulty, the first standby device obtains the first user information from the remote cache module of the first standby device and restores the first user information — S102

Related U.S. Application Data continuation of application No. PCT/CN2016/099732, filed on Sep. 22, 2016.

(51) Int. Cl.
*H04L 41/0823* (2022.01)
*H04L 41/0668* (2022.01)
*H04L 67/1029* (2022.01)
*H04L 67/1034* (2022.01)
*H04L 69/40* (2022.01)

(52) U.S. Cl.
CPC ...... *H04L 41/0836* (2013.01); *H04L 67/1029* (2013.01); *H04L 67/1034* (2013.01); *H04L 69/40* (2013.01)

(56) References Cited

U.S. PATENT DOCUMENTS

| | | | |
|---|---|---|---|
| 7,532,568 B1 * | 5/2009 | Boudreaux | H04W 24/04 370/225 |
| 7,549,079 B2 | 6/2009 | Connolly et al. | |
| 7,865,576 B2 | 1/2011 | Regan et al. | |
| 8,107,363 B1 | 1/2012 | Saluja | |
| 8,374,078 B2 | 2/2013 | Ballantyne et al. | |
| 8,583,753 B1 | 11/2013 | Bhagwatula et al. | |
| 8,661,287 B2 | 2/2014 | Spear | |
| 9,043,283 B2 | 5/2015 | Mcbrearty | |
| 9,173,117 B2 | 10/2015 | Haddad et al. | |
| 9,229,843 B2 | 1/2016 | Abbot et al. | |
| 9,344,494 B2 | 5/2016 | Mordani et al. | |
| 9,420,492 B2 | 8/2016 | Zheng et al. | |
| 9,727,358 B2 | 8/2017 | Jacobs et al. | |
| 9,749,320 B2 * | 8/2017 | Fan | H04W 56/00 |
| 10,210,058 B1 | 2/2019 | Srinath et al. | |
| 10,237,092 B2 | 3/2019 | Poscher et al. | |
| 10,601,909 B2 | 3/2020 | Brandwine et al. | |
| 10,778,754 B2 | 9/2020 | Capello et al. | |
| 2004/0034807 A1 | 2/2004 | Rostowfske | |
| 2007/0078982 A1 | 4/2007 | Aidun et al. | |
| 2007/0168693 A1 | 7/2007 | Pittman | |
| 2008/0080365 A1 * | 4/2008 | Weeresinghe | H04L 69/40 370/216 |
| 2008/0263390 A1 * | 10/2008 | Baba | G06F 11/1484 714/E11.073 |
| 2009/0073998 A1 * | 3/2009 | Allan | H04L 12/4625 370/401 |
| 2010/0131591 A1 | 5/2010 | Thomas et al. | |
| 2011/0066592 A1 | 3/2011 | Newport et al. | |
| 2012/0023361 A1 * | 1/2012 | Hammam | H04L 61/2521 714/E11.073 |
| 2012/0155247 A1 | 6/2012 | Li et al. | |
| 2012/0204058 A1 | 8/2012 | Yuan et al. | |
| 2013/0024426 A1 | 1/2013 | Flowers et al. | |
| 2013/0031403 A1 | 1/2013 | Mordani et al. | |
| 2013/0036095 A1 | 2/2013 | Titchener et al. | |
| 2013/0124801 A1 | 5/2013 | Natrajan et al. | |
| 2013/0262923 A1 | 10/2013 | Benson et al. | |
| 2014/0071811 A1 * | 3/2014 | Niu | H04L 12/2876 370/221 |
| 2014/0075494 A1 | 3/2014 | Fadida et al. | |
| 2014/0188795 A1 | 7/2014 | Alewine et al. | |
| 2014/0233387 A1 * | 8/2014 | Zheng | H04W 12/06 370/235 |
| 2014/0328161 A1 * | 11/2014 | Haddad | H04L 45/586 370/219 |
| 2015/0006948 A1 | 1/2015 | Yamabiraki et al. | |
| 2015/0074251 A1 | 3/2015 | Tameshige et al. | |
| 2015/0271103 A1 | 9/2015 | Thayalan et al. | |
| 2015/0381407 A1 | 12/2015 | Wang et al. | |
| 2016/0065494 A1 | 3/2016 | Aiello et al. | |
| 2016/0085462 A1 | 3/2016 | Buzzard et al. | |
| 2016/0197835 A1 | 7/2016 | Luft | |
| 2017/0006131 A1 | 1/2017 | Dennis et al. | |
| 2018/0026814 A1 | 1/2018 | Poscher et al. | |
| 2020/0028731 A1 * | 1/2020 | Luo | H04L 41/0668 |

FOREIGN PATENT DOCUMENTS

| | | |
|---|---|---|
| CN | 101635638 A | 1/2010 |
| CN | 102118309 A | 7/2011 |
| CN | 103684839 A | 3/2014 |
| CN | 104158693 A | 11/2014 |
| CN | 104301140 A | 1/2015 |
| CN | 105099793 A | 11/2015 |
| EP | 2482499 A1 | 8/2012 |
| EP | 2632082 A2 | 8/2013 |

* cited by examiner

HOT STANDBY METHOD, APPARATUS, AND SYSTEM

CROSS-REFERENCE TO RELATED APPLICATIONS

This application is a continuation of U.S. patent application Ser. No. 15/934,382, filed on Mar. 23, 2018, which is a continuation of International Application No. PCT/CN2016/099732, filed on Sep. 22, 2016. The International Application claims priority to Chinese Patent Application No. 201510618629.7, filed on Sep. 24, 2015. The disclosures of the aforementioned applications are hereby incorporated by reference in their entireties. All of the aforementioned patent applications are hereby incorporated by reference in their entireties.

TECHNICAL FIELD

Embodiments of the present disclosure relate to Internet technologies, and in particular, to a hot standby method, apparatus, and system.

BACKGROUND

In current network application, to avoid a risk of network interruption caused due to a single point of failure, dual-host hot standby between devices should be supported for a service node at an aggregation layer or an edge layer.

In an existing dual-host hot standby method, an active device and a standby device form a hot standby group. When a user accesses the active device, the active device saves user information corresponding to the user into an external database shared with the standby device, so that when the active device becomes faulty, the standby device reads the user information from the external database and restores the user information of the user.

However, in the dual-host hot standby method in the prior art, there is a relatively large delay in restoring the user information of the user. Consequently, a communications device fault protection requirement required for hot standby cannot be met, and service interruption may occur.

SUMMARY

Embodiments of the present disclosure provide a hot standby method, apparatus, and system, so that a multi-host hot standby function is implemented, and user information of a faulty device may be quickly restored, thereby improving restoration efficiency.

According to a first aspect, an embodiment of the present disclosure provides a hot standby method, where the method is applied to a hot standby system; the hot standby system includes at least one hot standby group; the hot standby group includes: an active device and at least one standby device corresponding to the active device; and the method includes:

saving, by the active device, first user information of the active device into a local cache module of the active device, where the local cache module of the active device is configured to store user information of the active device; and sending, by the active device, the first user information to a remote cache module of a first standby device based on preset correlation information, so that when detecting that the active device becomes faulty, the first standby device obtains the first user information from the remote cache module of the first standby device and restores the first user information, where the first standby device is a device in the at least one standby device, and the remote cache module of the first standby device is configured to store the user information of the active device, where the preset correlation information includes: an active-standby relationship between the active device and the first standby device and a first priority of the first standby device, where the first priority indicates a priority level of restoring the user information of the active device by the first standby device.

With reference to the first aspect, in a first possible implementation of the first aspect, the hot standby group is a multi-host hot standby group; and correspondingly, the active device is an active broadband network gateway (BNG), and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

With reference to the first aspect or the first possible implementation of the first aspect, in a second possible implementation of the first aspect, the method further includes:

saving, by the active device, second user information of the active device into the local cache module of the active device; and correspondingly, sending, by the active device, the second user information of the active device to a remote cache module of a second standby device based on the preset correlation information, so that when detecting that the active device becomes faulty, the second standby device obtains the second user information from the remote cache module of the second standby device and restores the second user information, where the second standby device is a device in the at least one standby device, and the remote cache module of the second standby device is configured to store the user information of the active device, where the preset correlation information further includes: an active-standby relationship between the active device and the second standby device, a second priority of the second standby device, and a load balancing relationship between the first standby device and the second standby device, where the second priority indicates a priority level of restoring the user information of the active device by the second standby device; the first priority is the same as the second priority; and the load balancing relationship is used to indicate that when the active device becomes faulty, the first standby device is configured to be responsible for restoring the first user information, and the second standby device is configured to be responsible for restoring the second user information.

With reference to the second possible implementation of the first aspect, in a third possible implementation of the first aspect, the first user information is information corresponding to a user who accesses by using a first interface of the active device, and the second user information is information corresponding to a user who accesses by using a second interface of the active device, where the first interface is different from the second interface.

With reference to the first aspect or the first possible implementation of the first aspect, in a fourth possible implementation of the first aspect, the method further includes:

sending, by the active device, the first user information to a remote cache module of a third standby device based on the preset correlation information, where the third standby device is a device in the at least one standby device, where the preset correlation information further includes: an active-standby relationship between the active device and the third standby device and a third priority of the third standby device, where the third priority indicates a priority level of restoring the user information of the active device by the third standby device, and the third priority is lower than the first priority.

With reference to the second or the third possible implementation of the first aspect, in a fifth possible implementation of the first aspect, the method further includes:

sending, by the active device, the first user information and the second user information to a remote cache module of a third standby device based on the preset correlation information, where the third standby device is a device in the at least one standby device, where the preset correlation information further includes: an active-standby relationship between the active device and the third standby device and a third priority of the third standby device, where the third priority indicates a priority level of restoring the user information of the active device by the third standby device, and the third priority is lower than the first priority.

With reference to the first aspect, or the first or the fourth possible implementation of the first aspect, in a sixth possible implementation of the first aspect, after the saving, by the active device, first user information of the active device into a local cache module of the active device, the method further includes:

saving, by the active device, the first user information into an external database shared with the at least one standby device.

With reference to the second, the third, or the fifth possible implementation of the first aspect, in a seventh possible implementation of the first aspect, after the saving, by the active device, second user information of the active device into the local cache module of the active device, the method further includes:

saving, by the active device, the first user information and the second user information into an external database shared with the at least one standby device.

With reference to any one of the first aspect, or the first to the seventh possible implementations of the first aspect, in an eighth possible implementation of the first aspect, before the saving, by the active device, first user information of the active device into a local cache module of the active device, the method further includes:

obtaining, by the active device, the preset correlation information.

According to a second aspect, an embodiment of the present disclose provides a hot standby method, where the method is applied to a hot standby system; the hot standby system includes at least one hot standby group; the hot standby group includes: an active device and at least one standby device corresponding to the active device; the at least one standby device includes a first standby device with a first priority; the first priority indicates a priority level of restoring user information of the active device by the first standby device; and the method includes:

receiving, by the first standby device, first user information sent by the active device, and saving the first user information into a remote cache module of the first standby device, where the remote cache module of the first standby device is configured to store the user information of the active device; and when detecting that the active device becomes faulty, obtaining, by the first standby device, the first user information from the remote cache module and restoring the first user information.

With reference to the second aspect, in a first possible implementation of the second aspect, the hot standby group is a multi-host hot standby group; and correspondingly, the active device is an active broadband network gateway (BNG), and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

With reference to the second aspect or the first possible implementation of the second aspect, in a second possible implementation of the second aspect, after the saving the first user information into a remote cache module of the first standby device, the method further includes:

establishing, by the first standby device, an index based on identity information of the active device; and correspondingly, the obtaining, by the first standby device, the first user information from the remote cache module and restoring the first user information includes:

directly obtaining, by the first standby device, the first user information from the remote cache module based on the index and restoring the first user information.

With reference to the first possible implementation of the second aspect, in a third possible implementation of the second aspect, when the hot standby group is the multi-service control module hot standby group of the virtual BNG, correspondingly, when the active device is the active service control module of the virtual BNG, and the first standby device is the first standby service control module of the virtual BNG, after the obtaining, by the first standby device, the first user information from the remote cache module and restoring the first user information, the method further includes:

sending, by the first standby service control module, a notification instruction to a service forwarding module, where the notification instruction is used to instruct the service forwarding module to send a user management message of a user corresponding to the first user information to the first standby service control module.

According to a third aspect, an embodiment of the present disclosure provides an active device, where the active device belongs to a hot standby system; the hot standby system includes at least one hot standby group; the hot standby group includes: the active device and at least one standby device corresponding to the active device; and the active device includes:

a first storage module, configured to save first user information of the active device into a local cache module of the active device, where the local cache module of the active device is configured to store user information of the active device; and a first sending module, configured to send the first user information to a remote cache module of a first standby device based on preset correlation information, so that when detecting that the active device becomes faulty, the first standby device obtains the first user information from the remote cache module of the first standby device and restores the first user information, where the first standby device is a device in the at least one standby device, and the remote cache module of the first standby device is configured to store the user information of the active device, where the preset correlation information includes: an active-standby relationship between the active device and the first standby device and a first priority of the first standby device, where the first priority indicates a priority level of restoring the user information of the active device by the first standby device.

With reference to the third aspect, in a first possible implementation of the third aspect, the hot standby group is a multi-host hot standby group; and correspondingly, the active device is an active broadband network gateway (BNG), and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

With reference to the third aspect or the first possible implementation of the third aspect, in a second possible implementation of the third aspect, the active device further includes:

a second storage module, configured to save second user information of the active device into the local cache module of the active device; and a second sending module, configured to send the second user information of the active device to a remote cache module of a second standby device based on the preset correlation information, so that when detecting that the active device becomes faulty, the second standby device obtains the second user information from the remote cache module of the second standby device and restores the second user information, where the second standby device is a device in the at least one standby device, and the remote cache module of the second standby device is configured to store the user information of the active device, where the preset correlation information further includes: an active-standby relationship between the active device and the second standby device, a second priority of the second standby device, and a load balancing relationship between the first standby device and the second standby device, where the second priority indicates a priority level of restoring the user information of the active device by the second standby device; the first priority is the same as the second priority; and the load balancing relationship is used to indicate that when the active device becomes faulty, the first standby device is configured to be responsible for restoring the first user information, and the second standby device is configured to be responsible for restoring the second user information.

With reference to the second possible implementation of the third aspect, in a third possible implementation of the third aspect, the first user information is information corresponding to a user who accesses by using a first interface of the active device, and the second user information is information corresponding to a user who accesses by using a second interface of the active device, where the first interface is different from the second interface.

With reference to the third aspect or the first possible implementation of the third aspect, in a fourth possible implementation of the third aspect, the active device further includes:

a third sending module, configured to send the first user information to a remote cache module of a third standby device based on the preset correlation information, where the third standby device is a device in the at least one standby device, where the preset correlation information further includes: an active-standby relationship between the active device and the third standby device and a third priority of the third standby device, where the third priority indicates a priority level of restoring the user information of the active device by the third standby device, and the third priority is lower than the first priority.

With reference to the second or the third possible implementation of the third aspect, in a fifth possible implementation of the third aspect, the active device further includes:

a fourth sending module, configured to send the first user information and the second user information to a remote cache module of a third standby device based on the preset correlation information, where the third standby device is a device in the at least one standby device, where the preset correlation information further includes: an active-standby relationship between the active device and the third standby device and a third priority of the third standby device, where the third priority indicates a priority level of restoring the user information of the active device by the third standby device, and the third priority is lower than the first priority.

With reference to the third aspect, or the first or the fourth possible implementation of the third aspect, in a sixth possible implementation of the third aspect, the active device further includes:

a third storage module, configured to save the first user information into an external database shared with the at least one standby device.

With reference to the second, the third, or the fifth possible implementation of the third aspect, in a seventh possible implementation of the third aspect, the active device further includes:

a fourth storage module, configured to save the first user information and the second user information into an external database shared with the at least one standby device.

According to a fourth aspect, an embodiment of the present disclosure provides a first standby device, where the first standby device belongs to a hot standby system; the hot standby system includes at least one hot standby group; the hot standby group includes: an active device and at least one standby device corresponding to the active device; the at least one standby device includes the first standby device with a first priority; the first priority indicates a priority level of restoring user information of the active device by the first standby device; and the first standby device includes:

a storage module, configured to: receive first user information sent by the active device, and save the first user information into a remote cache module of the first standby device, where the remote cache module of the first standby device is configured to store the user information of the active device; and a restoration module, configured to: when detecting that the active device becomes faulty, obtain the first user information from the remote cache module and restore the first user information.

With reference to the fourth aspect, in a first possible implementation of the fourth aspect, the hot standby group is a multi-host hot standby group; and correspondingly, the active device is an active broadband network gateway (BNG), and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

With reference to the fourth aspect or the first possible implementation of the fourth aspect, in a second possible implementation of the fourth aspect, the first standby device further includes:

an establishment module, configured to establish an index based on identity information of the active device; and correspondingly, the restoration module is configured to: directly obtain the first user information from the remote cache module based on the index and restore the first user information.

With reference to the first possible implementation of the fourth aspect, in a third possible implementation of the fourth aspect, when the hot standby group is the multi-service control module hot standby group of the virtual BNG, correspondingly, when the active device is the active service control module of the virtual BNG, and the first standby device is the first standby service control module of the virtual BNG, the first standby device further includes:

a notification module, configured to send a notification instruction to a service forwarding module, where the notification instruction is used to instruct the service forwarding module to send a user management message of a user corresponding to the first user information to the first standby service control module.

According to a fifth aspect, an embodiment of the present disclosure provides a hot standby system. The hot standby system includes at least one hot standby group, and the hot standby includes: the active device in any implementation of the third aspect and at least one standby device corresponding to the active device. The at least one standby device includes the first standby device in any implementation of the fourth aspect.

In one embodiment of the present disclosure, the active device saves the first user information of the active device into the local cache module of the active device; further, the active device sends the first user information to the remote cache module of the first standby device based on the preset correlation information, so that when detecting that the active device becomes faulty, the first standby device directly obtains the first user information from the remote cache module of the first standby device and restores the first user information. It may be learned that in the embodiments of the present disclosure, a multi-host hot standby function may be implemented, and user information of a faulty device may be quickly restored, thereby improving restoration efficiency.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
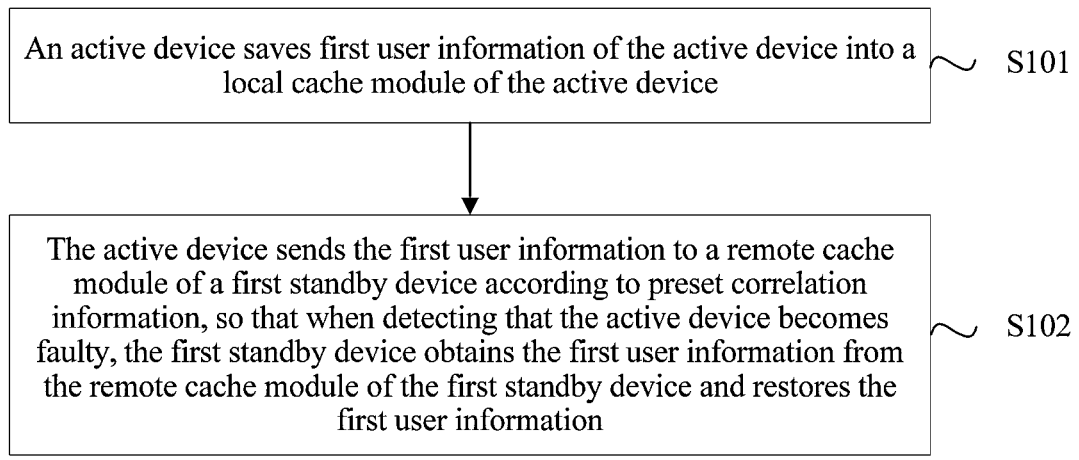
FIG. 1 is a schematic flowchart of Embodiment 1 of a hot standby method according to the present disclosure.

FIG. 1 is a schematic flowchart of Embodiment 1 of a hot standby method according to the present disclosure. The method in this embodiment is applied to a hot standby system. The hot standby system includes at least one hot standby group, and the hot standby group includes: an active device and at least one standby device corresponding to the active device. As shown in FIG. 1, the method in this embodiment may include the following steps.

S101. The active device saves first user information of the active device into a local cache module of the active device.

In this embodiment of the present disclosure, a local cache module and a remote cache module are added to both the active device and the standby device in this embodiment of the present disclosure, to reduce a service restoration time consumed when the active device becomes faulty. The local cache module is configured to store user information of a local device (for example, the local cache module of the active device is configured to store user information of the active device, and a local cache module of the standby device is configured to store user information of the standby device). The remote cache module is configured to store user information of another device that belongs to a same hot standby group as the local device and whose priority is higher than that of the local device (for example, a hot standby group 1 includes: a device 1, a device 2, and a device 3; a priority of the device 1 is higher than a priority of the device 2, and the priority of the device 2 is higher than a priority of the device 3; and a remote cache module of the device 2 is configured to store user information of the device 1, and a remote cache module of the device 3 is configured to store the user information of the device 1 and user information of the device 2). Optionally, the local cache module of the active device and/or the standby device may be a local cache data module. The remote cache module of the active device and/or the standby device may be a remote cache data module. Optionally, a memory address of the local cache module of the active device and/or the standby device is different from a memory address of the remote cache module of the active device and/or the standby device.

In this embodiment of the present disclosure, when a user accesses/disconnects from the active device, or statistics of the user should be updated, the active device saves the first user information of the active device into the local cache module of the active device. Optionally, the first user information may be user information corresponding to all online/offline users of the active device, or user information corresponding to some online/offline users of the active device (for example, information corresponding to a user who accesses by using a first interface of the active device). The first user information may include information such as a user identity (ID), a Media Access Control (MAC) address of a user, an Internet Protocol (IP) address of a user, physical location information of a user, an access protocol attribute of a user, session group information, and traffic statistics.

S102. The active device sends the first user information to a remote cache module of a first standby device based on preset correlation information, so that when detecting that the active device becomes faulty, the first standby device obtains the first user information from the remote cache module of the first standby device and restores the first user information.

The first standby device is a device in the at least one standby device. The remote cache module of the first standby device is configured to store the user information of the active device. The preset correlation (correlation) information includes: an active-standby relationship between the active device and the first standby device and a first priority of the first standby device, where the first priority indicates a priority level of restoring the user information of the active device by the first standby device.

In this embodiment of the present disclosure, the active device sends the first user information to the remote cache module of the first standby device based on the preset correlation information, so that when detecting that the active device becomes faulty, the first standby device directly obtains the first user information from the remote cache module of the first standby device and restores the first user information, with no need to read the first user information from an external database to restore the first user information. The first standby device is a device with a highest priority in the at least one standby device (the first standby device has the first priority). Because a remote cache module of any standby device is configured to store user information of another device that belongs to a same hot standby group as the local device and whose priority is higher than that of the local device, the remote cache module of the first standby device is configured to store the user information of the active device (that is, there is only the active device whose priority is higher than that of the first standby device in the hot standby group). The preset correlation information includes: the active-standby relationship between the active device and the first standby device and the first priority of the first standby device. The first priority indicates the priority level of restoring the user information of the active device by the first standby device (optionally, the first standby device is a standby device with a highest priority in the at least one standby device; or the active device in the hot standby group has a highest priority, the at least one standby device has descending priorities, and the first standby device is a standby device with a highest priority in the at least one standby device).

In this embodiment of the present disclosure, step S101 may be performed before step S102, step S102 may be performed before step S101, or step S101 and step S102 may be concurrently performed. An execution sequence of step S101 and step S102 is not limited in this embodiment of the present disclosure.

In this embodiment of the present disclosure, the active device saves the first user information of the active device into the local cache module of the active device; further, the active device sends the first user information to the remote cache module of the first standby device based on the preset correlation information, so that when detecting that the active device becomes faulty, the first standby device directly obtains the first user information from the remote cache module of the first standby device and restores the first user information. It may be learned that in this embodiment of the present disclosure, a multi-host hot standby function may be implemented, and user information of a faulty device may be quickly restored, thereby improving restoration efficiency.

Optionally, the method further includes:

sending, by the active device, the first user information to a remote cache module of a third standby device based on the preset correlation information, where the third standby device is a device in the at least one standby device.

The preset correlation information further includes: an active-standby relationship between the active device and the third standby device and a third priority of the third standby device, where the third priority indicates a priority level of restoring the user information of the active device by the third standby device, and the third priority is lower than the first priority.

In this embodiment of the present disclosure, the active device may further send the first user information to the remote cache module of the third standby device based on the preset correlation information (including the active-standby relationship between the active device and the first standby device, the active-standby relationship between the active device and the third standby device, the first priority of the first standby device, and the third priority of the third standby device), where the third standby device is another device other than the first standby device in the at least one standby device, and the priority of the third standby device is lower than the priority of the first standby device (that is, the third priority is lower than the first priority), so that when the first standby device also becomes faulty, a standby device with a highest priority in the third standby device obtains the first user information from a remote cache module of the standby device and quickly restores the first user information. Certainly, an execution sequence of the step in which the active device sends the first user information to the remote cache module of the first standby device and the step in which the active device sends the first user information to the remote cache module of the third standby device is not limited in this embodiment of the present disclosure.

Optionally, after step S101, the method further includes: saving, by the active device, the first user information into an external database shared with the at least one standby device.

To avoid a problem that the first user information cannot be restored because an error occurs (the first user information is not saved) in the remote cache module of the first standby device, in this embodiment of the present disclosure, after step S101, the active device may further save the first user information into the external database shared with the at least one standby device, so that when the first user information is not found in the remote cache module of the first standby device, the first standby device may obtain the first user information from the external database, so as to restore the first user information.

Optionally, the method further includes:

saving, by the active device, second user information of the active device into the local cache module of the active device; and correspondingly, sending, by the active device, the second user information of the active device to a remote cache module of a second standby device based on the preset correlation information, so that when detecting that the active device becomes faulty, the second standby device obtains the second user information from the remote cache module of the second standby device and restores the second user information, where the second standby device is a device in the at least one standby device, and the remote cache module of the second standby device is configured to store the user information of the active device.

The preset correlation information further includes: an active-standby relationship between the active device and the second standby device, a second priority of the second standby device, and a load balancing relationship between the first standby device and the second standby device, where the second priority indicates a priority level of restoring the user information of the active device by the second standby device; the first priority is the same as the second priority; and the load balancing relationship is used to indicate that when the active device becomes faulty, the first standby device is configured to be responsible for restoring the first user information, and the second standby device is configured to be responsible for restoring the second user information.

In this embodiment of the present disclosure, if the standby device with a highest priority in the at least one standby device includes the first standby device and the second standby device, the preset correlation information further includes: the active-standby relationship between the active device and the second standby device, the second priority of the second standby device (the second priority indicates the priority level of restoring the user information of the active device by the second standby device, and the first priority is the same as the second priority), and the load balancing relationship between the first standby device and the second standby device (used to indicate that when the active device becomes faulty, the first standby device is configured to be responsible for restoring the first user information, and the second standby device is configured to be responsible for restoring the second user information). Optionally, the load balancing relationship is divided based on an interface used by a user of the active device to access the active device. For example, the first standby device is configured to be responsible for restoring information (that is, the first user information) corresponding to a user who accesses by using the first interface of the active device, and the second standby device is configured to be responsible for restoring information (that is, the second user information) corresponding to a user who accesses by using a second interface of the active device. The first interface is different from the second interface. For example, the standby device with a highest priority in the at least one standby device includes a standby device A (that is, the first standby device) and a standby device B (that is, the second standby device), and the load balancing relationship is used to indicate that the standby device A is configured to be responsible for restoring the first user information corresponding to a user who accesses by using the first interface of the active device, and the standby device B is configured to be responsible for restoring the second user information corresponding to a user who accesses by using the second interface of the active device.

In this embodiment of the present disclosure, if the standby device with a highest priority in the at least one standby device includes the first standby device and the second standby device, the active device saves the first user information (optionally, the first user information is the information corresponding to a user who accesses by using the first interface of the active device) of the active device into the local cache module of the active device, and the active device sends the first user information to the remote cache module of the first standby device based on the preset correlation information (including the active-standby relationship between the active device and the first standby device, the active-standby relationship between the active device and the second standby device, the first priority of the first standby device, the second priority of the second standby device, and the load balancing relationship between the first standby device and the second standby device). In addition, the active device saves the second user information (the information corresponding to a user who accesses by using the second interface of the active device) of the active device into the local cache module of the active device, and the active device sends the second user information of the active device to the remote cache module of the second standby device based on the preset correlation information, so that when detecting that the active device becomes faulty, the second standby device obtains the second user information from the remote cache module of the second standby device and restores the second user information. Certainly, a sequence of saving the first user information and the second user information by the active device is not limited in this embodiment of the present disclosure (that is, the first user information may be saved before the second user information, the second user information may be saved before the first user information, or the first user information and the second user information may be saved at the same time).

Optionally, the method further includes:

sending, by the active device, the first user information and the second user information to a remote cache module of a third standby device based on the preset correlation information, where the third standby device is a device in the at least one standby device.

The preset correlation information further includes: an active-standby relationship between the active device and the third standby device and a third priority of the third standby device, where the third priority indicates a priority level of restoring the user information of the active device by the third standby device, and the third priority is lower than the first priority.

In this embodiment of the present disclosure, the active device may further send the first user information and the second user information to the remote cache module of the third standby device based on the preset correlation information (including the active-standby relationship between the active device and the first standby device, the active-standby relationship between the active device and the second standby device, the active-standby relationship between the active device and the third standby device, the first priority of the first standby device, the second priority of the second standby device, and the third priority of the third standby device), where the third standby device is another device other than the first standby device and the second standby device in the at least one standby device, and the priority of the third standby device is lower than the priority of the first standby device and/or the second standby device (that is, the third priority is lower than the first priority and/or the second priority), so that when the first standby device and/or the second standby device also become/becomes faulty, a standby device with a highest priority in the third standby device obtains the first user information and/or the second user information from a remote cache module of the standby device and quickly performs a restoration. Certainly, an execution sequence of the step in which the active device sends the first user information to the remote cache module of the first standby device, the step in which the active device sends the second user information to the remote cache module of the second standby device, and the step in which the active device sends the first user information and the second user information to the remote cache module of the third standby device is not limited in this embodiment of the present disclosure.

Optionally, after the saving, by the active device, second user information of the active device into the local cache module of the active device, the method further includes: saving, by the active device, the first user information and the second user information into an external database shared with the at least one standby device.

To avoid a problem that the first user information and/or the second user information cannot be restored because an error occurs in the remote cache module of the first standby device and/or the remote cache module of the second standby device (the first user information is not saved into the remote cache module of the first standby device and/or the second user information is not saved into the remote cache module of the second standby device), in this embodiment of the present disclosure, after the active device saves the second user information of the active device into the local cache module of the active device, the active device saves the first user information and the second user information into the external database shared with the at least one standby device, so that when the first user information is not found in the remote cache module of the first standby device and/or the second user information is not found in the remote cache module of the second standby device, the first standby device and/or the second standby device may obtain corresponding user information from the external database, so as to restore the user information.

Optionally, before step S101, the method further includes: obtaining, by the active device, the preset correlation information.

In this embodiment of the present disclosure, optionally, before a service is started, the preset correlation information may be pre-configured for the active device and the standby device. Optionally, the preset correlation information includes: an active-standby relationship between the active device and the at least one standby device, and priorities of the active device and the at least one standby device. Optionally, an active-standby relationship between multiple devices in a same hot standby group is determined based on priorities, and a device with a high priority (the active device) backs up user information to a device with a priority lower than and neighboring to the high priority (the first standby device). When the active device becomes faulty, the first standby device starts restoration of the user information of the active device. Optionally, a device with a high priority periodically sends heartbeat information to a device with a low priority, so that the device with a low priority detects, in real time, whether the device with a high priority becomes faulty (if no heart information of the device with a high priority is received within a preset time period, it may be learned that the device with a high priority becomes faulty).

Optionally, when there are multiple devices with a second-highest priority (the first standby device and the second standby device), a load balancing relationship between the multiple devices with a second-highest priority may be specified. The load balancing relationship is used to indicate that when the device with a highest priority (that is, the active device) becomes faulty, the multiple devices with a second-highest priority are separately responsible for restoring which users of the device with a highest priority, so as to ensure response consistency of the devices with a second-highest priority (for example, the first standby device is configured to be responsible for restoring the first user information corresponding to a user who accesses by using the first interface of the active device, and the second standby device is configured to be responsible for restoring the second user information corresponding to a user who accesses by using the second interface of the active device) when the device with a highest priority becomes faulty. Optionally, division of the load balancing relationship may be based on an interface used by a user to access the active device, or based on a MAC address, or the like. This is not limited in this embodiment of the present disclosure.

Optionally, to improve utilization of each device, optionally, device members between different hot standby groups may be repeated in this embodiment of the present disclosure. Active-standby functions in multiple hot standby groups are distributed to different devices by setting priorities of devices in different hot standby groups, so that the devices may work at the same time. For example, an active device in a hot standby group 1 is a device 1 (the device 1 has a highest priority in the hot standby group 1). A standby device corresponding to the device 1 is a device 2, but the device 2 is an active device in a hot standby group 2 (the device 2 has a highest priority in the hot standby group 2). A standby device corresponding to the device 2 may be a device 3. It may be learned that the device 1 and the device 2 are respectively used as active devices of two different hot standby groups and may work at the same time.

Optionally, the hot standby group in the foregoing embodiment of the present disclosure is a multi-host hot standby group; and correspondingly, the active device is an active broadband network gateway (BNG), and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

In this embodiment of the present disclosure, when the hot standby group is the multi-host hot standby group, the multi-host hot standby group includes: the active BNG and at least one standby BNG corresponding to the active BNG. The active device is the active BNG, and the first standby device is the first standby BNG with a highest priority in the at least one standby BNG Correspondingly, for a detailed hot standby method, refer to the foregoing part of this embodiment of the present disclosure, and details are not described herein. Optionally, the BNG may be a broadband remote access server (BRAS). Alternatively, when the hot standby group is the multi-service control module hot standby group of the virtual BNG, the multi-service control module hot standby group of the virtual BNG includes: the active service control module of the virtual BNG and at least one standby service control module corresponding to the active service control module. The active device is the active service control module of the virtual BNG, and the first standby device is the first standby service control module that is of the virtual BNG and whose priority is the highest in the at least one standby service control module. Correspondingly, for a detailed hot standby method, refer to the foregoing part of this embodiment of the present disclosure, and details are not described herein.

Figure 2:
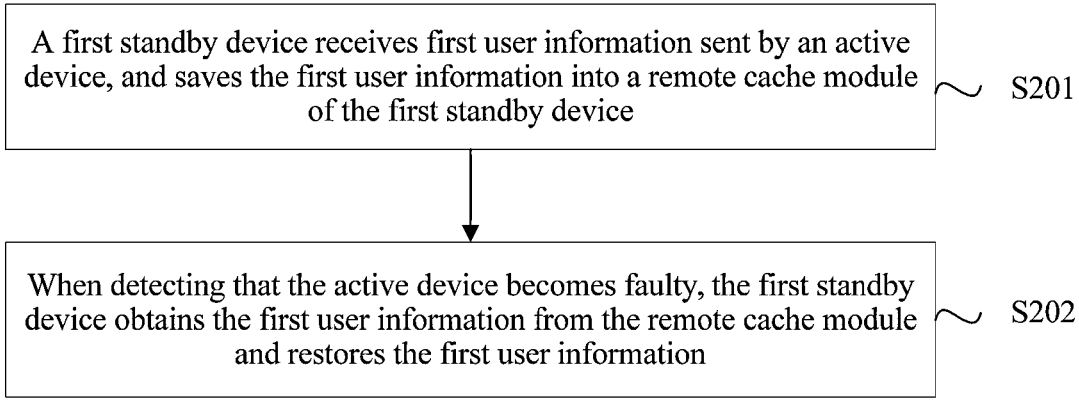
FIG. 2 is a schematic flowchart of Embodiment 2 of a hot standby method according to the present disclosure.

FIG. 2 is a schematic flowchart of Embodiment 2 of a hot standby method according to the present disclosure. The method in this embodiment is applied to a hot standby system. The hot standby system includes at least one hot standby group, and the hot standby group includes: an active device and at least one standby device corresponding to the active device. The at least one standby device includes a first standby device with a first priority. The first priority indicates a priority level of restoring user information of the active device by the first standby device. Based on the foregoing embodiment of the present disclosure, a standby device side is described in detail in this embodiment. As shown in FIG. 2, the method in this embodiment may include the following steps.

S201. The first standby device receives first user information sent by the active device, and saves the first user information into a remote cache module of the first standby device.

The remote cache module of the first standby device is configured to store the user information of the active device.

In this embodiment of the present disclosure, when a user accesses/disconnects from the active device, or statistics of the user should be updated, the first standby device receives the first user information sent by the active device based on pre-planned correlation information, and saves the first user information into the remote cache module of the first standby device (optionally, the remote cache module is configured to cache user information of another device that belongs to a same hot standby group as the first standby device and whose priority is higher than that of the first standby device), so that when the active device becomes faulty, the first standby device may directly obtain the first user information from the remote cache module of the first standby device and quickly restore the first user information. Optionally, the preset correlation information includes: an active-standby relationship between the active device and the first standby device and a first priority of the first standby device. Optionally, the first user information may be user information corresponding to all online/offline users of the active device, or user information corresponding to some online/offline users of the active device (for example, information corresponding to a user who accesses by using a first interface of the active device). The first user information may include information such as a user ID, a MAC address of a user, an IP address of a user, physical location information of a user, an access protocol attribute of a user, session group information, and traffic statistics.

S202. When detecting that the active device becomes faulty, the first standby device obtains the first user information from the remote cache module and restores the first user information.

In this embodiment of the present disclosure, optionally, a device with a high priority (for example, the active device) periodically sends heartbeat information to a device with a low priority (for example, the first standby device), so that the device with a low priority detects, in real time, whether the device with a high priority becomes faulty. When no heartbeat information sent by the active device is received within a preset time period, the first standby device detects that the active device becomes faulty, and further the first standby device directly obtains the first user information from the remote cache module of the first standby device and restores the first user information. Optionally, if a standby device with a highest priority in the at least one standby device also becomes faulty, a standby device with a second-highest priority in the at least one standby device obtains the first user information from a remote cache module of the first standby device and quickly restores the first user information (that is, the standby device with a second-highest priority is a standby device with a highest priority in standby devices that can normally work in the at least one standby device, that is, the standby device with a second-highest priority may also be referred to as a first standby device).

In this embodiment of the present disclosure, the first standby device receives the first user information sent by the active device, and saves the first user information into the remote cache module of the first standby device. Further, when detecting that the active device becomes faulty, the first standby device directly obtains the first user information from the remote cache module and restores the first user information. It may be learned that in this embodiment of the present disclosure, a multi-host hot standby function may be implemented, and user information of a faulty device may be quickly restored, thereby improving restoration efficiency.

Optionally, after the saving the first user information into a remote cache module of the first standby device, the method further includes:

establishing, by the first standby device, an index based on identity information of the active device.

Correspondingly, the obtaining, by the first standby device, the first user information from the remote cache module and restoring the first user information includes:

directly obtaining, by the first standby device, the first user information from the remote cache module based on the index and restoring the first user information.

To make the first standby device be able to read, in one time when the active device becomes faulty, all the first user information stored in the remote cache module of the first standby device by the active device, so as to reduce a restoration time, in this embodiment of the present disclosure, optionally, after saving the first user information into the remote cache module of the first standby device, the first standby device establishes the index based on the identity information of the active device. Further, when detecting that the active device becomes faulty, the first standby device may obtain the first user information from the remote cache module in one time based on the index and restore the first user information, so as to improve restoration efficiency.

Optionally, before step S201, the method further includes: obtaining, by the first standby device, the preset correlation information.

In this embodiment of the present disclosure, optionally, before a service is started, the preset correlation information may be pre-configured for the active device and the standby device. Optionally, the preset correlation information includes: an active-standby relationship between the active device and the at least one standby device, and priorities of the active device and the at least one standby device. Optionally, an active-standby relationship between multiple devices in a same hot standby group is determined based on priorities, and a device with a high priority (the active device) backs up user information to a device with a priority lower than and neighboring to the high priority (the first standby device). When the active device becomes faulty, the first standby device starts restoration of the user information of the active device. Optionally, a device with a high priority periodically sends heartbeat information to a device with a low priority, so that the device with a low priority detects, in real time, whether the device with a high priority becomes faulty (if no heart information of the device with a high priority is received within a preset time period, it may be learned that the device with a high priority becomes faulty). Optionally, when there are multiple devices with a second-highest priority (the first standby device and the second standby device), a load balancing relationship between the multiple devices with a second-highest priority may be specified. That is, the load balancing relationship is used to indicate that when the device with a highest priority (that is, the active device) becomes faulty, the multiple devices with a second-highest priority are separately responsible for restoring which users of the device with a highest priority, so as to ensure response consistency of the devices with a second-highest priority (for example, the first standby device is configured to be responsible for restoring the first user information corresponding to a user who accesses by using the first interface of the active device, and the second standby device is configured to be responsible for restoring the second user information corresponding to a user who accesses by using the second interface of the active device) when the device with a highest priority becomes faulty. Optionally, division of the load balancing relationship may be based on an interface used by a user to access the active device, or based on a MAC address, or the like. This is not limited in this embodiment of the present disclosure.

Optionally, the hot standby group in the foregoing embodiment of the present disclosure is a multi-host hot standby group; and correspondingly, the active device is an active broadband network gateway BNG, and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

In this embodiment of the present disclosure, when the hot standby group is the multi-host hot standby group, the multi-host hot standby group includes: the active BNG and at least one standby BNG corresponding to the active BNG The active device is the active BNG, and the first standby device is the first standby BNG with a highest priority in the at least one standby BNG Alternatively, when the hot standby group is the multi-service control module hot standby group of the virtual BNG, the multi-service control module hot standby group of the virtual BNG includes: the active service control module of the virtual BNG and at least one standby service control module corresponding to the active service control module. The active device is the active service control module of the virtual BNG, and the first standby device is the first standby service control module that is of the virtual BNG and whose priority is the highest in the at least one standby service control module.

Optionally, when the hot standby group is the multi-service control module hot standby group of the virtual BNG, correspondingly, when the active device is the active service control module of the virtual BNG, and the first standby device is the first standby service control module of the virtual BNG, after the obtaining, by the first standby device, the first user information from the remote cache module and restoring the first user information, the method further includes:

sending, by the first standby service control module, a notification instruction to a service forwarding module, where the notification instruction is used to instruct the service forwarding module to send a user management message of a user corresponding to the first user information to the first standby service control module.

In this embodiment of the present disclosure, when the hot standby group is the multi-service control module hot standby group of the virtual BNG, because service forwarding and service control are implemented by different modules, when the active service control module becomes faulty, user information of the active service control module should be handed over to the first standby service control module. Therefore, after obtaining the first user information from the remote cache module of the first standby service control module and restoring the first user information, the first standby service control module sends the notification instruction to the service forwarding module of the virtual BNG The notification instruction is used to instruct the service forwarding module to send a user management message of a user corresponding to the first user information to the first standby service control module, with no need to send the user management message to the active service control module. The first user information may be user information corresponding to multiple users, and the notification instruction is used to instruct the service forwarding module to send a user management message of each user corresponding to the first user information to the first standby service control module.

Figure 3A:
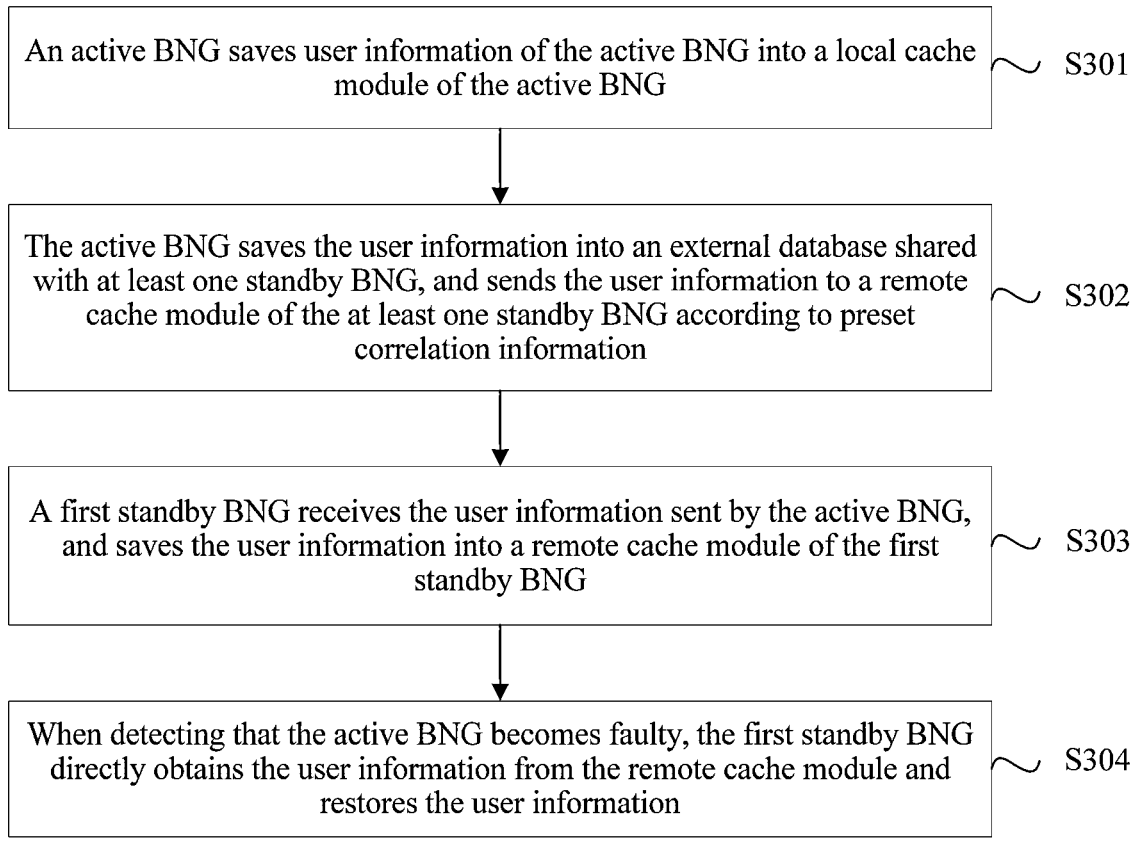
FIG. 3A is a schematic flowchart of Embodiment 3 of a hot standby method according to the present disclosure.
Figure 3B:
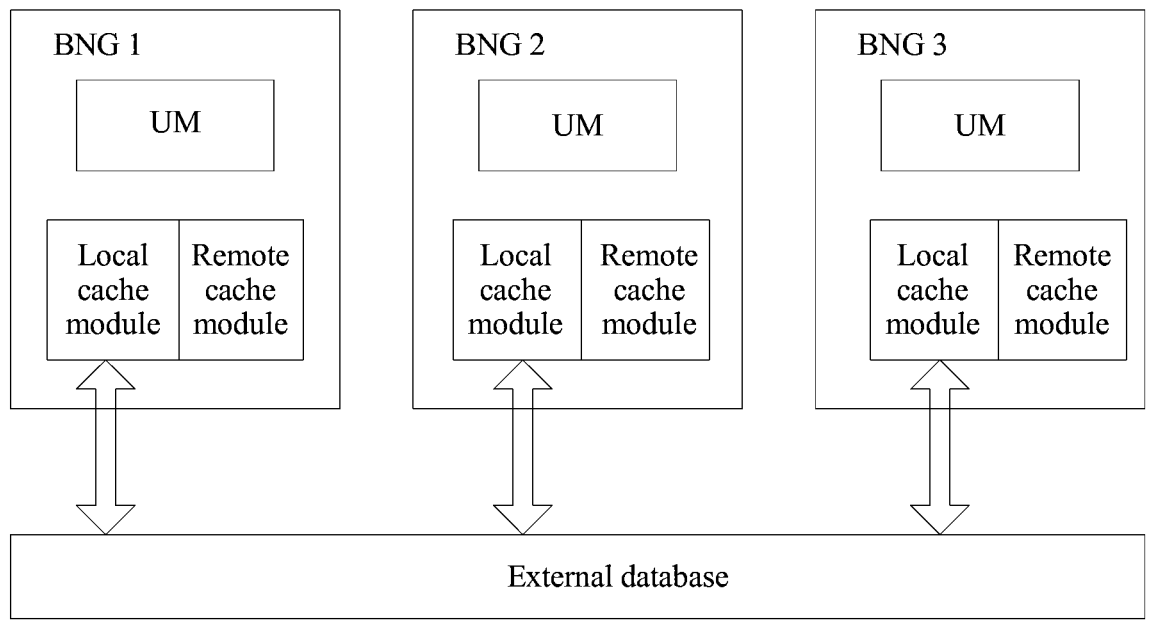
FIG. 3B is a schematic structural diagram of Embodiment 1 of a hot standby system according to the present disclosure.

FIG. 3A is a schematic flowchart of Embodiment 3 of a hot standby method according to the present disclosure. FIG. 3B is a schematic structural diagram of Embodiment 1 of a hot standby system according to the present disclosure. The method in this embodiment is applied to a hot standby system. The hot standby system includes at least one multi-host hot standby group, and the multi-host hot standby group includes: an active BNG and at least one standby BNG corresponding to the active BNG The first standby BNG is a standby BNG with a highest priority in the at least one standby BNG As shown in FIG. 3A, the method in this embodiment may include the following steps.

S301. The active BNG saves user information of the active BNG into a local cache module of the active BNG.

In this embodiment of the present disclosure, when a user accesses/disconnects from the active BNG, or statistics of the user should be updated, the active BNG saves the user information of the active BNG into the local cache module of the active BNG Optionally, a user management module UM of the active BNG is configured to be responsible for user access/disconnection or statistics management. When a user accesses the active BNG, the UM saves user information of the user into the local cache module of the active BNG.

Optionally, before step S301, the method further includes: obtaining, by the active BNG and the at least one standby BNG of the active BNG, preset correlation information.

In this embodiment of the present disclosure, before a service is started, the preset correlation information may be pre-configured for the active BNG and the standby BNG The preset correlation information includes: an active-standby relationship between the active BNG and the at least one standby BNG, and priorities of the active BNG and the at least one standby BNG Optionally, an active-standby relationship between multiple BNGs in a same hot standby group is determined based on priorities, and a BNG with a highest priority (the active BNG) backs up user information to a BNG with a second-highest priority (the first standby BNG). When the active BNG becomes faulty, the first standby BNG starts restoration of the user information of the active BNG Optionally, a BNG with a high priority periodically sends heartbeat information to a BNG with a low priority, so that the BNG with a low priority detects, in real time, whether the BNG with a high priority becomes faulty (if no heart information of the BNG with a high priority is received within a preset time period, it may be learned that the BNG with a high priority becomes faulty). Optionally, when there are multiple BNGs with a second-highest priority, a load balancing relationship between the multiple BNGs with a second-highest priority (the first standby BNG and a second standby BNG) may be specified. That is, when the BNG with a highest priority (the active BNG) becomes faulty, the multiple BNGs with a second-highest priority are separately responsible for restoring which users of the BNG with a highest priority, so as to ensure response consistency of the BNGs with a second-highest priority (for example, the first standby BNG is configured to be responsible for restoring first user information corresponding to a user who accesses by using a first interface of the active BNG, and the second standby BNG is configured to be responsible for restoring second user information corresponding to a user who accesses by using a second interface of the active BNG) when the BNG with a highest priority becomes faulty.

In this embodiment of the present disclosure, as shown in FIG. 3B, the hot standby system consists of a BNG 1, a BNG 2, and a BNG 3. Each BNG includes a user management module UM, a local cache module, and a remote cache module. The BNGs share a same external database. The hot standby system includes three hot standby groups. As shown in Table 1 (Table 1 is pre-planned correlation information 1), the BNG 1 and the BNG 2 constitute a hot standby group 1; the BNG 1, the BNG 2, and the BNG 3 constitute a hot standby group 2; and the BNG 1, the BNG 2, and the BNG 3 constitute a hot standby group 3.

TABLE 1

Pre-planned correlation information 1

| Hot Standby Group | Interface | BNG Instance Number | Priority | Status | Sharing Method Used When Standby Devices Have a Same Priority |
|---|---|---|---|---|---|
| Hot standby group 1 | Interface 1 and interface 2 of a BNG 1 | BNG 1 | 100 | Active | / |
| | | BNG 2 | 50 | Standby | / |
| Hot standby group 2 | Interface 1 and interface 2 of a BNG 2 | BNG 1 | 50 | Standby 1 | / |
| | | BNG 2 | 100 | Active | / |
| | | BNG 3 | 20 | Standby 2 | / |
| Hot standby group 3 | Interface 1 and interface 2 of a BNG 3 | BNG 3 | 200 | Active | / |
| | | BNG 1 | 100 | Standby 1 | User who accesses by using the interface 1 |
| | | BNG 2 | 100 | Standby 1 | User who accesses by using the interface 2 |

According to the description in Table 1, the following may be learned: (1) The BNG 2 (that is, a first standby BNG) in the hot standby group 1 provides protection and restoration of user information for the BNG 1 (an active BNG). That is, user information of all users who access the BNG 1 by using the interface 1 and the interface 2 of the BNG 1 should be saved into the BNG 2. In addition, the BNG 2 detects a working status of the BNG 1, and when the BNG 1 becomes faulty, the BNG 2 restores the user information of the BNG 1. (2) The BNG 3 and the BNG 1 in the hot standby group 2 provide protection and restoration of user information for the BNG 2. Because a priority of the BNG 1 is higher than that of the BNG 3, that is, the BNG 1 is a first standby BNG, when the BNG 2 becomes faulty, the BNG 1 first restores the user information of the BNG 2. Optionally, if the BNG 1 does not respond within a preset time (that is, the BNG 1 may also become faulty), in this case, the BNG 3 starts to restore the user information of the BNG 2. (3) Two standby BNGs with a same priority (that is, a first standby BNG and a second standby BNG) are configured for the BNG 3 (an active BNG) in the hot standby group 3. In this case, a load balancing relationship between the first standby BNG and the second standby BNG further should be defined, that is, how the first standby BNG and the second standby BNG share responsibility for restoring users of the active BNG when the active BNG becomes faulty. Optionally, division of the load balancing relationship may be based on an interface used by a user to access the active device, or based on a MAC address, or the like. This is not limited in this embodiment of the present disclosure. For example, in an example shown in Table 1, for the BNG 3 in the hot standby group 3, the standby BNGs are balanced, based on different interfaces used by users to access the active BNG, to be responsible for restoring users of the active BNG User information of the BNG 3 is separately backed up to the BNG 1 and the BNG 2 based on an interface used by a user to access the active BNG For example, the load balancing relationship between the first standby BNG and the second standby BNG (that is, a load balancing relationship between the BNG 1 and the BNG 2) is used to indicate that the BNG 1 is configured to be responsible for restoring first user information corresponding to a user who accesses by using the interface 1 of the BNG 3, and the BNG 2 is configured to be responsible for restoring second user information corresponding to a user who accesses by using the interface 2 of the BNG 3. Optionally, to ensure workload balancing between BNGs in a hot standby system (that is, the active-standby BNGs may work at the same time), the hot standby system is divided into multiple hot standby groups, and active-standby functions in the multiple hot standby groups are distributed to different BNGs by setting priorities of BNGs in different hot standby groups, so that the BNGs may work at the same time to improve utilization. For example, the active BNGs in the three pre-planned hot standby groups in Table 1 are respectively distributed to the BNG 1, the BNG 2, and the BNG 3, so as to improve utilization of the BNGs.

In this embodiment of the present disclosure, when a user accesses the BNG 3, UM in the BNG 3 saves user information of the user into the local cache module of the active BNG.

S302. The active BNG saves the user information into an external database shared with the at least one standby BNG, and sends the user information to a remote cache module of the at least one standby BNG based on preset correlation information.

In this embodiment of the present disclosure, optionally, by checking an address of the configured external database and invoking an external database interface function, the local cache module of the active BNG saves the user information into the external database shared with the at least one standby BNG Further, the local cache module of the active BNG sends the user information to the remote cache module of the at least one standby BNG based on the preset correlation information, for example, sends the user information to a remote cache module of the first standby BNG with a highest priority in the at least one standby BNG Alternatively, if the standby BNG with a highest priority in the at least one standby BNG includes the first standby BNG and the second standby BNG, the active BNG sends the first user information in the user information to a remote cache module of the first standby BNG, and sends the second user information in the user information to a remote cache module of the second standby BNG based on the preset correlation information (including at least the load balancing relationship between the first standby BNG and the second standby BNG). For example, the BNG 3 determines, based on the load balancing relationship between the first standby BNG and the second standby BNG (that is, the load balancing relationship between the BNG 1 and the BNG 2), that the first user information corresponding to a user who accesses by using the interface 1 of the BNG 3 should be backed up to a remote cache module of the BNG 1 (the first standby BNG), and starts a data write operation to synchronously send the first user information to the remote cache module of the BNG 1. Similarly, the BNG 3 determines, based on the load balancing relationship between the first standby BNG and the second standby BNG (that is, the load balancing relationship between the BNG 1 and the BNG 2), that the second user information corresponding to a user who accesses by using the interface 2 of the BNG 3 should be backed up to a remote cache module of the BNG 2 (the second standby BNG), and starts a data write operation to synchronously send the second user information to the remote cache module of the BNG 2.

S303. The first standby BNG receives the user information sent by the active BNG, and saves the user information into a remote cache module of the first standby BNG.

In this embodiment of the present disclosure, the first standby BNG with a highest priority in the at least one standby BNG receives the user information sent by the active BNG, and saves the user information into the remote cache module of the first standby BNG Further, the remote cache module of the first standby BNG establishes an index based on identity information of the active BNG When the active BNG becomes faulty, the first standby BNG can read, in one time based on the index, all the user information stored in the remote cache module of the first standby device BNG by the active BNG, so as to reduce a restoration time. For example, the BNG 1 receives the first user information sent by the BNG 3, and saves the first user information into the remote cache module of the BNG 1.

In this embodiment of the present disclosure, it is assumed that 200 users access the BNG 3, 80 users access by using the interface 1 (that is, 80 users access by using the interface 1 of the BNG 3), and 120 users access by using the interface 2 (that is, 120 users access by using the interface 2 of the BNG 3). In this case, quantities of users whose information is stored in the BNGs in the hot standby group are shown in Table 2 (Table 2 is standby distribution of 200 users on the BNG 3).

TABLE 2

Standby distribution of 200 users on a BNG 3

| Database | BNG 1 | | BNG 2 | | BNG 3 | |
|---|---|---|---|---|---|---|
| 200 online users | No online user | | No online user | | 200 online users | |
| | Local cache module | Remote cache module | Local cache module | Remote cache module | Local cache module | Remote cache module |
| | 0 | 80 | 0 | 120 | 200 | 0 |

S304. When detecting that the active BNG becomes faulty, the first standby BNG directly obtains the user information from the remote cache module and restores the user information.

In this embodiment of the present disclosure, the first standby BNG keeps detecting whether the active BNG becomes faulty. When detecting that the active BNG becomes faulty, the first standby BNG directly obtains the user information from the remote cache module of the first standby BNG and restores the user information. Optionally, when the first standby BNG detects that the active BNG becomes faulty, a UM module of the first standby BNG reads the user information from the remote cache module of the first standby BNG, and restores, in the UM module, access of a user corresponding to the user information. Optionally, if the user information stored in the remote cache module of the first standby BNG is lost, the first standby BNG reads the user information from the external database, and restores the access of the user.

For example, the BNG 1 and the BNG 2 detect a working status of the BNG 3. Once the BNG 1 and the BNG 2 detect that the BNG 3 becomes faulty, UM modules of the BNG 1 and the BNG 2 start a user restoration procedure for the BNG 3. The UM module of the BNG 1 obtains, from the remote cache module of the BNG 1, the first user information corresponding to a user who accesses by using the interface 1 of the BNG 3, and adds the first user information to a forwarding table, so as to implement restoration of the first user information. Correspondingly, the UM module of the BNG 2 obtains, from the remote cache module of the BNG 2, the second user information corresponding to a user who accesses by using the interface 2 of the BNG 3, and adds the second user information to a forwarding table, so as to implement restoration of the second user information. It may be learned that after the BNG 3 becomes faulty, users of the BNG 3 are taken over by the BNG 1 and the BNG 2, thereby implementing quick restoration for a faulty BNG Distribution of online users after the restoration is shown in Table 3 (Table 3 is quantities of users who access the BNG 1 and the BNG 2 after a fault occurs).

TABLE 3

Quantities of users who access a BNG 1 and a BNG 2 after a fault occurs

| Database Storage | BNG 1 | BNG 2 | BNG 3 |
|---|---|---|---|
| 200 | 80 | 120 | Faulty |

In conclusion, in this embodiment of the present disclosure, a multi-BNG hot standby function may be implemented, and user information of a faulty BNG may be quickly restored, thereby improving restoration efficiency. Further, a hot standby system in this embodiment of the present disclosure is generally divided into multiple hot standby groups. A many-to-many standby relationship between multiple BNGs in the hot standby system may be divided into multiple pieces of simple one-to-one "active-standby" correlation information (that is, the multiple BNGs are grouped into multiple independent hot standby groups, and simple one-to-one "active-standby" correlation information exists in each hot standby group), so that a standby operation between the multiple BNGs in the hot standby system is greatly simplified. Further, active BNGs in different hot standby groups are respectively distributed to different BNGs, so that BNGs may work at the same time to improve utilization.

Figure 4A:
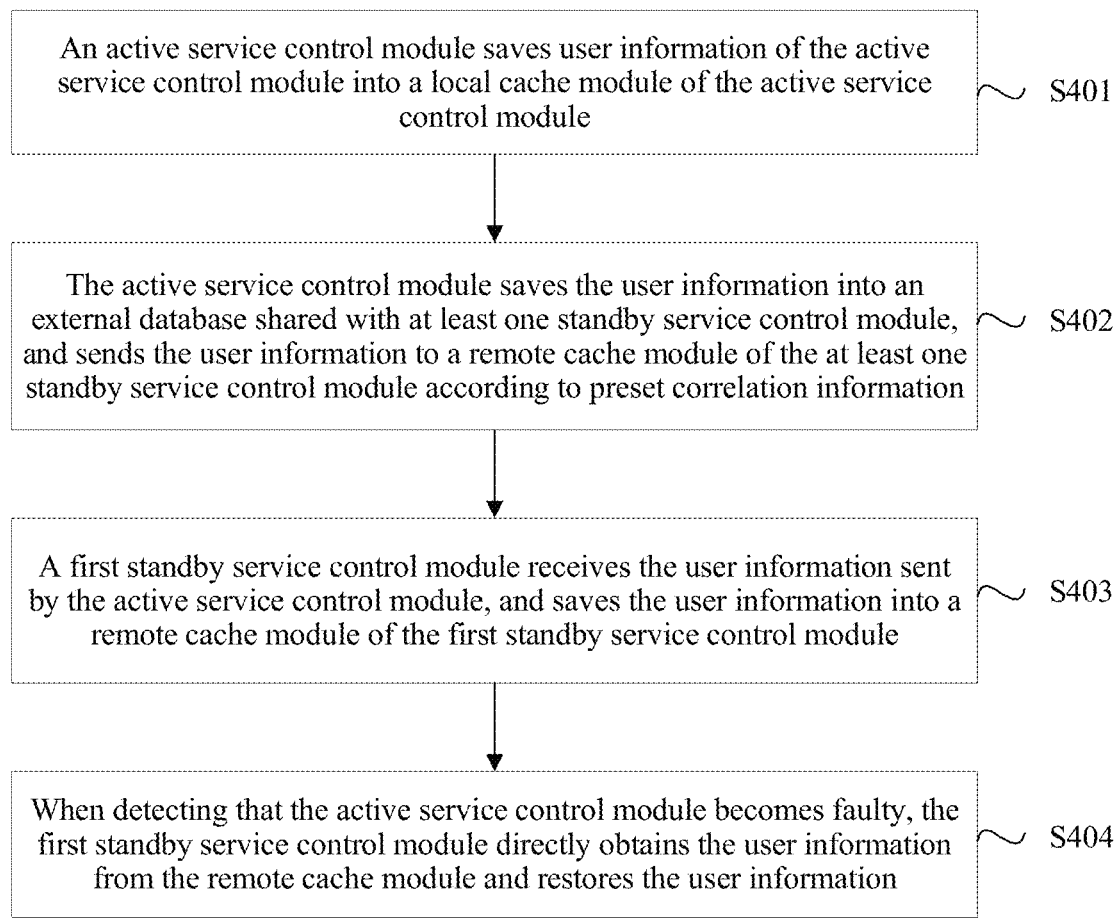
FIG. 4A is a schematic flowchart of Embodiment 4 of a hot standby method according to the present disclosure.
Figure 4B:
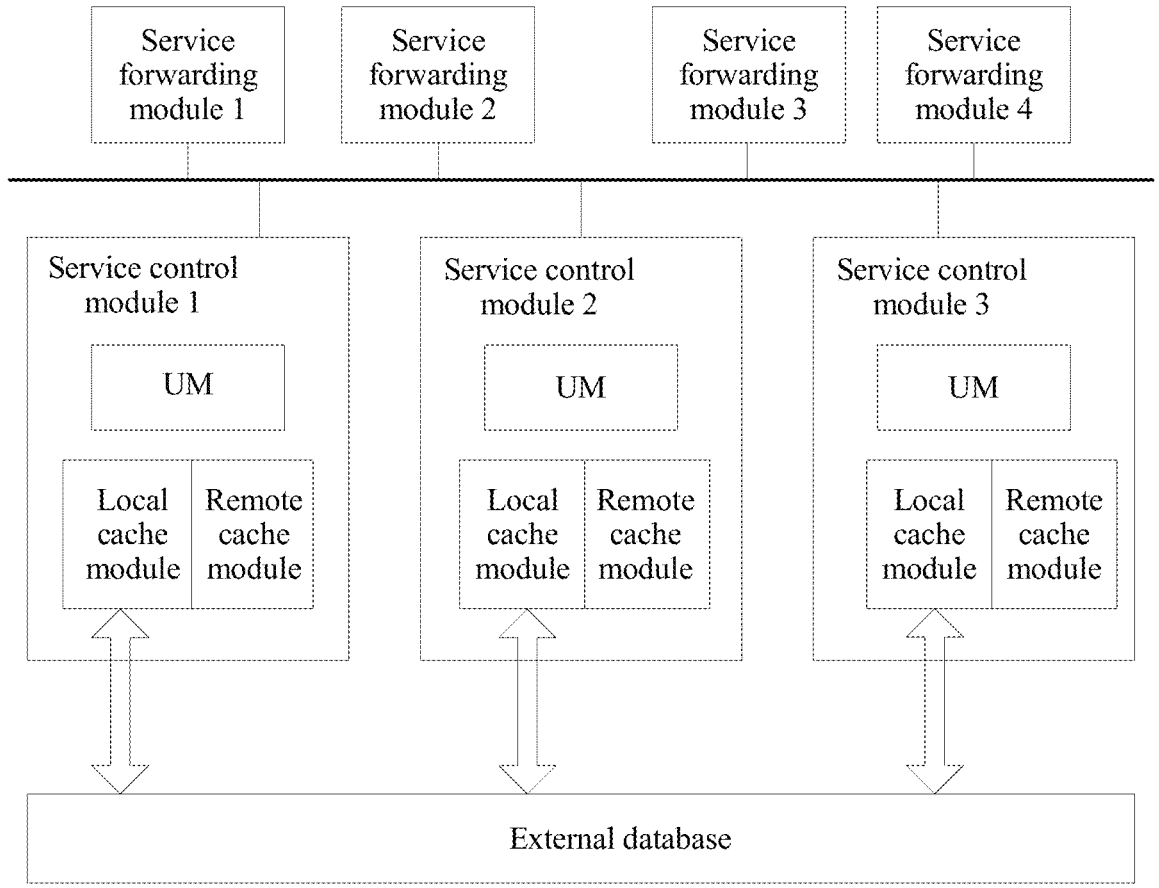
FIG. 4B is a schematic structural diagram of Embodiment 2 of a hot standby system according to the present disclosure.

FIG. 4A is a schematic flowchart of Embodiment 4 of a hot standby method according to the present disclosure. FIG. 4B is a schematic structural diagram of Embodiment 2 of a hot standby system according to the present disclosure. The method in this embodiment is applied to a hot standby system. The hot standby system includes at least one multi-service control module hot standby group of a virtual BNG, and the multi-service control module hot standby group of the virtual BNG includes: an active service control module of the virtual BNG and at least one standby service control module corresponding to the active service control module. The first standby service control module is a standby service control module with a highest priority in the at least one standby service control module of the virtual BNG As shown in FIG. 4A, the method in this embodiment may include the following steps.

S401. The active service control module saves user information of the active service control module into a local cache module of the active service control module.

In this embodiment of the present disclosure, when a user accesses/disconnects from the active service control module, or statistics of the user should be updated, the active service control module saves the user information of the active service control module into the local cache module of the active service control module. Optionally, a user management module UM of the active service control module is configured to be responsible for user access/disconnection or statistics management. When a user accesses the active service control module, the UM saves user information of the user into the local cache module of the active service control module.

Optionally, before step S401, the method further includes: obtaining, by the active service control module and the at least standby service control module of the active service control module, preset correlation information.

In this embodiment of the present disclosure, before a service is started, the preset correlation information may be pre-configured for the active service control module and the standby service control module. The preset correlation information includes: an active-standby relationship between the active service control module and the at least one standby service control module, and priorities of the active service control module and the at least one standby service control module. Optionally, an active-standby relationship between multiple service control modules in a same hot standby group is determined based on priorities, and a service control module with a highest priority (the active service control module) backs up user information to a service control module with a second-highest priority (the first standby service control module). When the active service control module becomes faulty, the first standby service control module starts restoration of the user information of the active service control module. Optionally, a service control module with a high priority periodically sends heartbeat information to a service control module with a low priority, so that the service control module with a low priority detects, in real time, whether the service control module with a high priority becomes faulty (if no heart information of the service control module with a high priority is received within a preset time period, it may be learned that the service control module with a high priority becomes faulty). Optionally, when there are multiple service control modules with a second-highest priority, a load balancing relationship between the multiple service control modules with a second-highest priority (the first standby service control module and a second standby service control module) may be specified. That is, when the service control module with a highest priority (the active service control module) becomes faulty, the multiple service control modules with a second-highest priority are separately responsible for restoring which users of the service control module with a highest priority, so as to ensure response consistency of the service control modules with a second-highest priority (for example, the first standby service control module is configured to be responsible for restoring first user information corresponding to a user who accesses by using a first interface of the active service control module, and the second standby service control module is configured to be responsible for restoring second user information corresponding to a user who accesses by using a second interface of the active service control module) when the service control module with a highest priority becomes faulty.

In this embodiment of the present disclosure, as shown in FIG. 4B, the hot standby system includes a service control module 1, a service control module 2, a service control module 3, a service forwarding module 1, a service forwarding module 2, a service forwarding module 3, and a service forwarding module 4. Each service control module includes a user management module UM, a local cache module, and a remote cache module. The service control modules share a same external database. The hot standby system includes three hot standby groups. As shown in Table 4 (Table 4 is pre-planned correlation information 2), the service control module 1 and the service control module 2 constitute a hot standby group 1; the service control module 1, the service control module 2, and the service control module 3 constitute a hot standby group 2; the service control module 1, the service control module 2, and the service control module 3 constitute a hot standby group 3.

TABLE 4

Pre-planned correlation information 2

| Hot Standby Group | Interface | Member in a Standby Group Service Control Module Instance Number | Priority | Status | Sharing Method Used When Standby Devices Have a Same Priority |
|---|---|---|---|---|---|
| Hot standby group 1 | Interface 1 and interface 2 of a service control module 1 | Service control module 1 | 100 | Active | / |
| | | Service control module 2 | 50 | Standby | / |
| Hot standby group 2 | Interface 1 and interface 2 of a service control module | Service control module 1 | 50 | Standby 1 | / |
| | | Service control module 2 | 100 | Active | / |
| | | Service control module 3 | 20 | Standby 2 | / |
| Hot standby group 3 | Interface 1 and interface 2 of a service control module | Service control module 3 | 200 | Active | / |
| | | Service control module 1 | 100 | Standby 1 | User who accesses by using the interface 1 |
| | | Service control module 2 | 100 | Standby 1 | User who accesses by using the interface 2 |

According to the description in Table 4, the following may be learned: (1) The service control module 2 (that is, a first standby service control module) in the hot standby group 1 provides protection and restoration of user information for the service control module 1 (an active service control module). That is, user information of all users who access the service control module 1 by using the interface 1 and the interface 2 of the service control module 1 should be saved into the service control module 2. In addition, the service control module 2 detects a working status of the service control module 1, and when the service control module 1 becomes faulty, the service control module 2 restores the user information of the service control module 1. (2) The service control module 3 and the service control module 1 in the hot standby group 2 provide protection and restoration of user information for the service control module 2. Because a priority of the service control module 1 is higher than that of the service control module 3, that is, the service control module 1 is a first standby service control module, when the service control module 2 becomes faulty, the service control module 1 first restores the user information of the service control module 2. Optionally, if the service control module 1 does not respond within a preset time (that is, the service control module 1 may also become faulty), in this case, the service control module 3 starts to restore the user information of the service control module 2. (3) Two standby service control modules with a same priority (that is, a first standby service control module and a second standby service control module) are configured for the service control module 3 (an active service control module) in the hot standby group 3. In this case, a load balancing relationship between the first standby service control module and the second standby service control module further should be defined, that is, how the first standby service control module and the second standby service control module share responsibility for restoring users of the active service control module when the active service control module becomes faulty. Optionally, division of the load balancing relationship may be based on an interface used by a user to access the active service control module, or based on a MAC address, or the like. This is not limited in this embodiment of the present disclosure. For example, in an example shown in Table 1, for the service control module 3 in the hot standby group 3, the standby service control modules are balanced, based on different interfaces used by users to access the active service control module, to be responsible for restoring users of the active service control module. User information of the service control module 3 is separately backed up to the service control module 1 and the service control module 2 based on an interface used by a user to access the active service control module. For example, the load balancing relationship between the first standby service control module and the second standby service control module (that is, a load balancing relationship between the service control module 1 and the service control module 2) is used to indicate that the service control module 1 is configured to be responsible for restoring first user information corresponding to a user who accesses by using the interface 1 of the service control module 3, and the service control module 2 is configured to be responsible for restoring second user information corresponding to a user who accesses by using the interface 2 of the service control module 3. Optionally, to ensure workload balancing between service control modules in a hot standby system (that is, the active-standby service control modules may work at the same time), the hot standby system is divided into multiple hot standby groups, and active-standby functions in the multiple hot standby groups are distributed to different service control modules by setting priorities of service control modules in different hot standby groups, so that the service control modules may work at the same time to improve utilization. For example, the active service control modules in the three pre-planned hot standby groups in Table 1 are respectively distributed to the service control module 1, the service control module 2, and the service control module 3, so as to improve utilization of the service control modules.

In this embodiment of the present disclosure, when a user accesses the service control module 3, UM in the service control module 3 saves user information of the user into the local cache module of the active service control module.

S402. The active service control module saves the user information into an external database shared with the at least one standby service control module, and sends the user information to a remote cache module of the at least one standby service control module based on preset correlation information.

In this embodiment of the present disclosure, optionally, by checking an address of the configured external database and invoking an external database interface function, the local cache module of the active service control module saves the user information into the external database shared with the at least one standby service control module. Further, the local cache module of the active service control module sends the user information to the remote cache module of the at least one standby service control module based on the preset correlation information, for example, sends the user information to a remote cache module of the first standby service control module with a highest priority in the at least one standby service control module. Alternatively, if the standby service control module with a highest priority in the at least one standby service control module includes the first standby service control module and the second standby service control module, the active service control module sends the first user information in the user information to a remote cache module of the first standby service control module, and sends the second user information in the user information to a remote cache module of the second standby service control module based on the preset correlation information (including at least the load balancing relationship between the first standby service control module and the second standby service control module). For example, the service control module 3 determines, based on the load balancing relationship between the first standby service control module and the second standby service control module (that is, the load balancing relationship between the service control module 1 and the service control module 2), that the first user information corresponding to a user who accesses by using the interface 1 of the service control module 3 should be backed up to a remote cache module of the service control module 1 (the first standby service control module), and starts a data write operation to synchronously send the first user information to the remote cache module of the service control module 1. Similarly, the service control module 3 determines, based on the load balancing relationship between the first standby service control module and the second standby service control module (that is, the load balancing relationship between the service control module 1 and the service control module 2), that the second user information corresponding to a user who accesses by using the interface 2 of the service control module 3 should be backed up to a remote cache module of the service control module 2 (the second standby service control module), and starts a data write operation to synchronously send the second user information to the remote cache module of the service control module 2.

S403. The first standby service control module receives the user information sent by the active service control module, and saves the user information into a remote cache module of the first standby service control module.

In this embodiment of the present disclosure, the first standby service control module with a highest priority in the at least one standby service control module receives the user information sent by the active service control module, and saves the user information into the remote cache module of the first standby service control module. Further, the remote cache module of the first standby service control module establishes an index based on identity information of the active service control module. When the active service control module becomes faulty, the first standby service control module can read, in one time based on the index, all the user information stored in the remote cache module of the first standby device service control module by the active service control module, so as to reduce a restoration time. For example, the service control module 1 receives the first user information sent by the service control module 3, and saves the first user information into the remote cache module of the service control module 1.

In this embodiment of the present disclosure, it is assumed that 200 users access the service control module 3, 80 users access by using the interface 1 (that is, 80 users access by using the interface 1 of the service control module 3), and 120 users access by using the interface 2 (that is, 120 users access by using the interface 2 of the service control module 3). In this case, quantities of users whose information is stored in the service control modules in the hot standby group are shown in Table 5 (Table 5 is standby distribution of 200 users on the service control module 3).

TABLE 5

Standby distribution of 200 users on a service control module 3

| Database | Service control module 1 | | Service control module 2 | | Service control module 3 | |
|---|---|---|---|---|---|---|
| 200 online users | No online user | | No online user | | 200 online users | |
| | Local cache module | Remote cache module | Local cache module | Remote cache module | Local cache module | Remote cache module |
| | 0 | 80 | 0 | 120 | 200 | 0 |

S404. When detecting that the active service control module becomes faulty, the first standby service control module directly obtains the user information from the remote cache module and restores the user information.

In this embodiment of the present disclosure, the first standby service control module keeps detecting whether the active service control module becomes faulty. When detecting that the active service control module becomes faulty, the first standby service control module directly obtains the user information from the remote cache module of the first standby service control module and restores the user information. Optionally, when the first standby service control module detects that the active service control module becomes faulty, a UM module of the first standby service control module reads the user information from the remote cache module of the first standby service control module, and restores, in the UM module, access of a user corresponding to the user information. Optionally, if the user information stored in the remote cache module of the first standby service control module is lost, the first standby service control module reads the user information from the external database, and restores the access of the user.

For example, the service control module 1 and the service control module 2 detect a working status of the service control module 3. Once the service control module 1 and the service control module 2 detect that the service control module 3 becomes faulty, UM modules of the service control module 1 and the service control module 2 start a user restoration procedure for the service control module 3. The UM module of the service control module 1 obtains, from the remote cache module of the service control module 1, the first user information corresponding to a user who accesses by using the interface 1 of the service control module 3, so as to implement restoration of the first user information. Correspondingly, the UM module of the service control module 2 obtains, from the remote cache module of the service control module 2, the second user information corresponding to a user who accesses by using the interface 2 of the service control module 3, so as to implement restoration of the second user information. It may be learned that after the service control module 3 becomes faulty, users of the service control module 3 are taken over by the service control module 1 and the service control module 2, thereby implementing quick restoration for a faulty service control module. Distribution of online users after the restoration is shown in Table 6 (Table 6 is quantities of users who access the service control module 1 and the service control module 2 after a fault occurs).

TABLE 6

Quantities of users who access a service control module 1 and a service control module 2 after a fault occurs

| Database Storage | Service control module 1 | Service control module 2 | Service control module 3 |
|---|---|---|---|
| 200 | 80 | 120 | Faulty |

Optionally, after step S404, the method further includes: sending, by the first standby service control module, a notification instruction to a service forwarding module of the virtual BNG, where the notification instruction is used to instruct the service forwarding module to send a user management message of a user corresponding to the user information to the first standby service control module.

In conclusion, in this embodiment of the present disclosure, a multi-service control module hot standby function of a virtual BNG may be implemented, and user information of a faulty service control module may be quickly restored, thereby improving restoration efficiency. Further, a hot standby system in this embodiment of the present disclosure is generally divided into multiple hot standby groups. Many-to-many correlation information between multiple service control modules in the hot standby system may be divided into multiple pieces of simple one-to-one "active-standby" correlation information (that is, the multiple service control modules are grouped into multiple independent hot standby groups, and simple one-to-one "active-standby" correlation information exists in each hot standby group, so that a standby operation between the multiple service control modules in the hot standby system is greatly simplified. Further, active service control modules in different hot standby groups are respectively distributed to different service control modules, so that service control modules may work at the same time to improve utilization.

Figure 5:
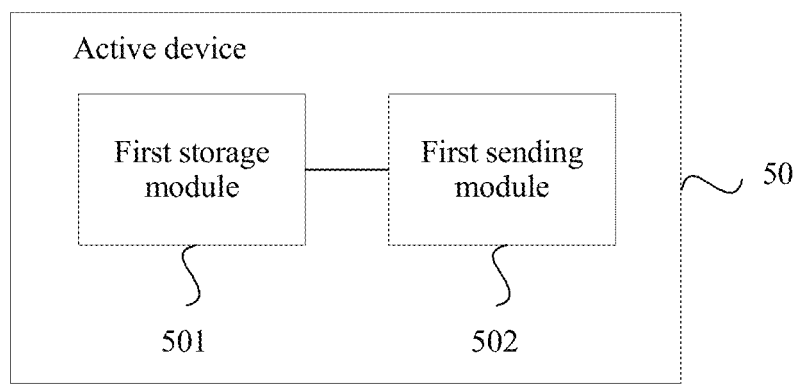
FIG. 5 is a schematic structural diagram of Embodiment 1 of an active device according to the present disclosure.

FIG. 5 is a schematic structural diagram of Embodiment 1 of an active device according to the present disclosure. As shown in FIG. 5, the active device 50 provided in this embodiment belongs to a hot standby system. The hot standby system includes at least one hot standby group, and the hot standby group includes: the active device 50 and at least one standby device corresponding to the active device 50. The active device 50 includes a first storage module 501 and a first sending module 502.

The first storage module 501 is configured to save first user information of the active device into a local cache module of the active device, where the local cache module of the active device is configured to store user information of the active device.

The first sending module 502 is configured to send the first user information to a remote cache module of a first standby device based on preset correlation information, so that when detecting that the active device becomes faulty, the first standby device obtains the first user information from the remote cache module of the first standby device and restores the first user information, where the first standby device is a device in the at least one standby device, and the remote cache module of the first standby device is configured to store the user information of the active device.

The preset correlation information includes: an active-standby relationship between the active device and the first standby device and a first priority of the first standby device, where the first priority indicates a priority level of restoring the user information of the active device by the first standby device.

Optionally, the hot standby group is a multi-host hot standby group; and correspondingly, the active device 50 is an active broadband network gateway BNG, and the first standby device is a first standby BNG; or the hot standby group is a multi-service control module hot standby group of a virtual BNG; and correspondingly, the active device 50 is an active service control module of the virtual BNG, and the first standby device is a first standby service control module of the virtual BNG.

Optionally, the active device further includes:

a second storage module, configured to save second user information of the active device into the local cache module of the active device; and a second sending module, configured to send the second user information of the active device to a remote cache module of a second standby device based on the preset correlation information, so that when detecting that the active device becomes faulty, the second standby device obtains the second user information from the remote cache module of the second standby device and restores the second user information, where the second standby device is a device in the at least one standby device, and the remote cache module of the second standby device is configured to store the user information of the active device.

The preset correlation information further includes: an active-standby relationship between the active device and the second standby device, a second priority of the second standby device, and a load balancing relationship between the first standby device and the second standby device, where the second priority indicates a priority level of restoring the user information of the active device by the second standby device; the first priority is the same as the second priority; and the load balancing relationship is used to indicate that when the active device becomes faulty, the first standby device is configured to be responsible for restoring the first user information, and the second standby device is configured to be responsible for restoring the second user information.

Optionally, the first user information is information corresponding to a user who accesses by using a first interface of the active device, and the second user information is information corresponding to a user who accesses by using a second interface of the active device, where the first interface is different from the second interface.

Optionally, the active device further includes:

a third sending module, configured to send the first user information to a remote cache module of a third standby device based on the preset correlation information, where the third standby device is a device in the at least one standby device.

The preset correlation information further includes: an active-standby relationship between the active device and the third standby device and a third priority of the third standby device, where the third priority indicates a priority level of restoring the user information of the active device by the third standby device, and the third priority is lower than the first priority.

Optionally, the active device further includes:

a fourth sending module, configured to send the first user information and the second user information to a remote cache module of a third standby device based on the preset correlation information, where the third standby device is a device in the at least one standby device.

The preset correlation information further includes: an active-standby relationship between the active device and the third standby device and a third priority of the third standby device, where the third priority indicates a priority level of restoring the user information of the active device by the third standby device, and the third priority is lower than the first priority.

Optionally, the active device further includes:

a third storage module, configured to save the first user information into an external database shared with the at least one standby device.

Optionally, the active device further includes:

a fourth storage module, configured to save the first user information and the second user information into an external database shared with the at least one standby device.

The active device in this embodiment may be configured to execute the technical solutions in the hot standby method embodiment 1, embodiment 3, and embodiment 4 of the present disclosure. An implementation principle and a technical effect of the active device are similar to those in the embodiments, and details are not described herein again.

Figure 6:
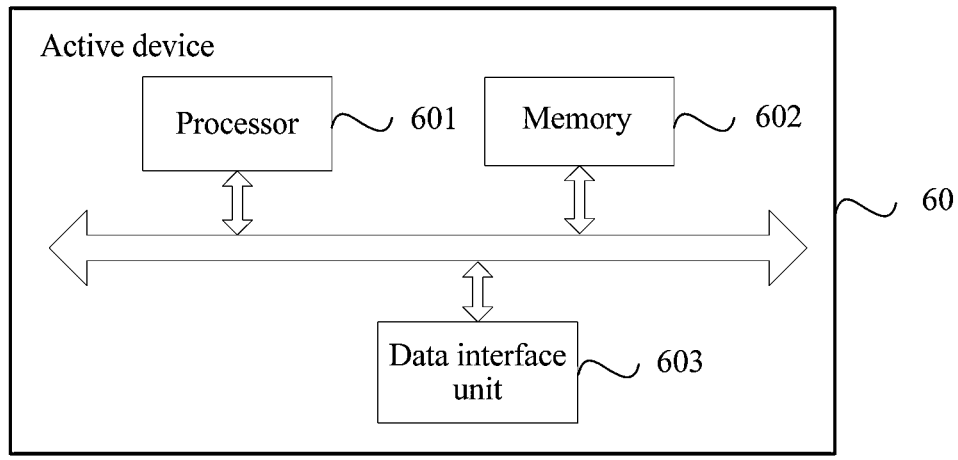
FIG. 6 is a schematic structural diagram of Embodiment 2 of an active device according to the present disclosure.

FIG. 6 is a schematic structural diagram of Embodiment 2 of an active device according to the present disclosure. As shown in FIG. 6, the active device 60 provided in this embodiment belongs to a hot standby system. The hot standby system includes at least one hot standby group, and the hot standby group includes: the active device 60 and at least one standby device corresponding to the active device 60. The active device 60 may include a processor 601 and a memory 602. The active device 60 may further include a data interface unit 603. The data interface unit 603 may be connected to the processor 601. The data interface unit 603 is configured to receive/send user information. The memory 602 is configured to store an execution instruction. When the active device 60 runs, the processor 601 and the memory 602 communicate with each other. The processor 601 invokes the execution instruction in the memory 602, so as to execute operations in the hot standby method embodiment 1, embodiment 3, and embodiment 4 of the present disclosure.

The active device in this embodiment may be configured to execute the technical solutions in the hot standby method embodiment 1, embodiment 3, and embodiment 4 of the present disclosure. An implementation principle and a technical effect of the active device are similar to those in the embodiments, and details are not described herein again.

Figure 7:
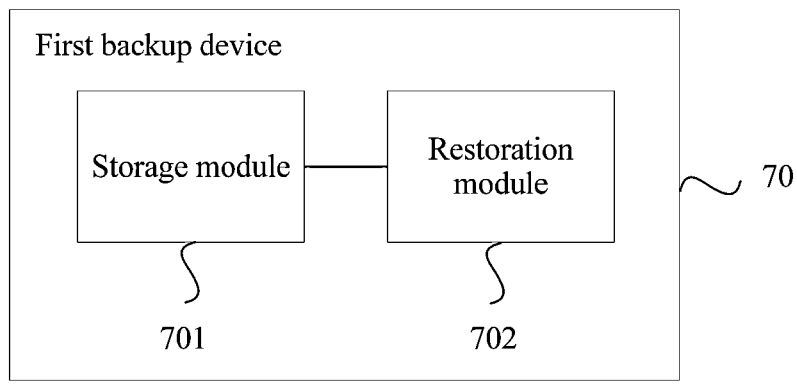
FIG. 7 is a schematic structural diagram of Embodiment 1 of a first standby device according to the present disclosure.

FIG. 7 is a schematic structural diagram of Embodiment 1 of a first standby device according to the present disclosure. As shown in FIG. 7, the first standby device 70 provided in this embodiment belongs to a hot standby system. The hot standby system includes at least one hot standby group, and the hot standby group includes: an active device and at least one standby device corresponding to the active device. The at least one standby device includes the first standby device with a first priority. The first priority indicates a priority level of restoring user information of the active device by the first standby device. The first standby device 70 includes a storage module 701 and a restoration module 702.

The storage module 701 is configured to: receive first user information sent by the active device, and save the first user information into a remote cache module of the first standby device, where the remote cache module of the first standby device is configured to store the user information of the active device.

The restoration module 702 is configured to: when detecting that the active device becomes faulty, obtain the first user information from the remote cache module and restore the first user information.

Optionally, the hot standby group is a multi-host hot standby group; and correspondingly, the active device is an active broadband network gateway BNG, and the first standby device is a first standby BNG; or the hot standby group is a multi-service control module hot standby group of a virtual BNG; and correspondingly, the active device is an active service control module of the virtual BNG, and the first standby device is a first standby service control module of the virtual BNG.

Optionally, the first standby device 70 further includes:

an establishment module, configured to establish an index based on identity information of the active device; and correspondingly, the restoration module is configured to: directly obtain the first user information from the remote cache module based on the index and restore the first user information.

Optionally, when the hot standby group is the multi-service control module hot standby group of the virtual BNG, correspondingly, when the active device is the active service control module of the virtual BNG, and the first standby device is the first standby service control module of the virtual BNG, the first standby device 70 further includes:

a notification module, configured to send a notification instruction to a service forwarding module, where the notification instruction is used to instruct the service forwarding module to send a user management message of a user corresponding to the first user information to the first standby service control module.

The first standby device in this embodiment may be configured to execute the technical solutions in the hot standby method embodiment 2, embodiment 3, and embodiment 4 of the present disclosure. An implementation principle and a technical effect of the first standby device are similar to those in the embodiments, and details are not described herein again.

Figure 8:
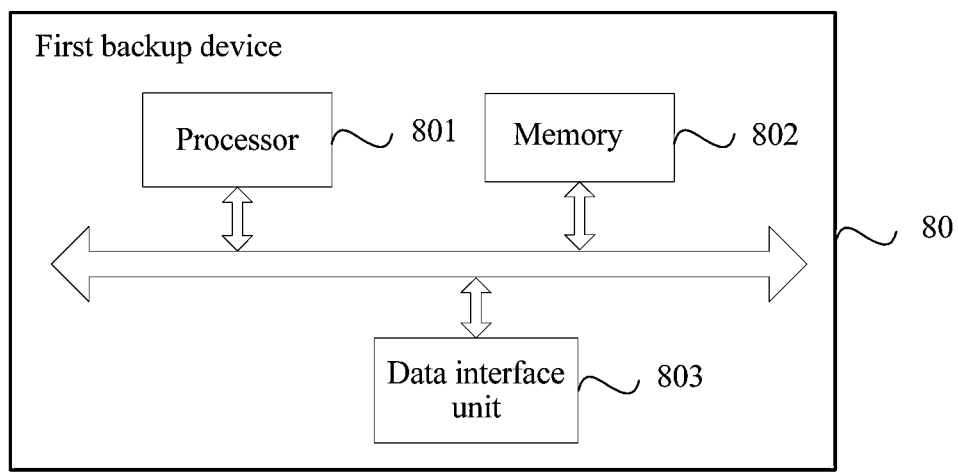
FIG. 8 is a schematic structural diagram of Embodiment 2 of a first standby device according to the present disclosure.

FIG. 8 is a schematic structural diagram of Embodiment 2 of a first standby device according to the present disclosure. As shown in FIG. 8, the first standby device 80 provided in this embodiment belongs to a hot standby system. The hot standby system includes at least one hot standby group, and the hot standby group includes: an active device and at least one standby device corresponding to the active device. The at least one standby device includes the first standby device with a first priority. The first priority indicates a priority level of restoring user information of the active device by the first standby device. The first standby device 80 may include a processor 801 and a memory 802. The first standby device 80 may further include a data interface unit 803. The data interface unit 803 may be connected to the processor 801. The data interface unit 803 is configured to receive/send user information. The memory 802 is configured to store an execution instruction. When the first standby device 80 runs, the processor 801 and the memory 802 communicate with each other. The processor 801 invokes the execution instruction in the memory 802, so as to execute operations in the hot standby method embodiment 2, embodiment 3, and embodiment 4 of the present disclosure.

The first standby device in this embodiment may be configured to execute the technical solutions in the hot standby method embodiment 2, embodiment 3, and embodiment 4. An implementation principle and a technical effect of the first standby device are similar to those in the embodiments, and details are not described herein again.

An embodiment of the present disclosure provides a hot standby system. The hot standby system includes at least one hot standby group, and the hot standby group includes: an active device and at least one standby device corresponding to the active device. The at least one standby device includes a first standby device. The active device may use structures in Embodiment 1 and Embodiment 2 of an active device, and may correspondingly execute the technical solutions in the hot standby method embodiment 1, embodiment 3, and embodiment 4. An implementation principle and a technical effect of the active device are similar to those in the embodiments, and details are not described herein again. The first standby device may use structures in Embodiment 1 and Embodiment 2 of a first standby device, and may correspondingly execute the technical solutions in the hot standby method embodiment 2, embodiment 3, and embodiment 4. An implementation principle and a technical effect of the first standby device are similar to those in the embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A network device, applied to a hot standby system comprising:
   an active device, and at least one standby device corresponding to the active device, wherein the at least one standby device comprises a first standby device and a second standby device, wherein the hot standby system comprises a load balancing relationship between the first standby device and the second standby device, a first active-standby relationship between the active device and the first standby device as to one or more first users, and a second active-standby relationship between the active device and the second standby device as to one or more second users, wherein the load balancing relationship indicates that when the active device has become faulty, the first standby device and the second standby device are responsible for taking over the one or more first users and the one or more second users respectively, and wherein the network device acts as the active device and comprises:

a memory comprising instructions; and
one or more processors in communication with the memory, wherein the one or more processors execute the instructions to cause the network device to:
send first user information corresponding to the one or more first users to the first standby device, wherein the first user information is used by the first standby device to take over the one or more first users when the active device becomes faulty, and
send second user information corresponding to the one or more second users to the second standby device, wherein the second user information is used by the second standby device to take over the one or more second users when the active device becomes faulty.

2. The network device of claim 1, wherein the active device comprises an active broadband network gateway (BNG), wherein the first standby device comprises a first standby BNG, and wherein the second standby device comprises a second standby BNG.

3. The network device of claim 1, wherein the first user information comprises at least one of following information: a user identity (ID), a Media Access Control (MAC) address of a user, an Internet Protocol (IP) address of the user, physical location information of the user, an access protocol attribute of the user, session information, or traffic statistics.

4. The network device of claim 1, wherein the load balancing relationship is divided based on an interface through which a user of the active device to access the active device, the one or more first users access the active device through a first interface of the active device, and the one or more second users access the active device through a second interface of the active device, and wherein the first interface is different from the second interface.

5. The network device of claim 1, wherein the one or more processors further execute the instructions to cause the network device to:
send the first user information to a third standby device of the at least one standby device, wherein the hot standby system comprises:
a third active-standby relationship between the active device and the third standby device as to the one or more first users, and
a first priority of the first standby device and a third priority of the third standby device, wherein the first priority indicates a priority level of taking over the one or more first users of the active device by the first standby device, and the third priority indicates a priority level of taking over the one or more first users of the active device by the third standby device, and wherein the third priority is lower than the first priority.

6. The network device of claim 1, wherein the one or more processors further execute the instructions to cause the network device to:
send the first user information and the second user information to a third standby device of the at least one standby device, wherein the hot standby system further comprises:
a third active-standby relationship between the active device and the third standby device as to the one or more first users and the one or more second users,
a first priority of the first standby device, wherein the first priority indicates a priority level of taking over the one or more first users of the active device by the first standby device,
a second priority of the second standby device, wherein the second priority indicates a priority level of taking over the one or more second users of the active device by the second standby device, and
a third priority of the third standby device, wherein the third priority indicates a priority level of taking over the one or more first users or the one or more second users of the active device by the third standby device, and wherein the third priority is lower than the first priority and the second priority.

7. The network device of claim 1, wherein the one or more processors further execute the instructions to cause the network device to:
save the first user information and the second user information of the active device into the memory of the active device, wherein the memory of the active device is configured to store user information of the active device.

8. The network device of claim 7, wherein the one or more processors further execute the instructions to cause the network device to:
save the first user information into an external database shared with the at least one standby device.

9. The network device of claim 7, wherein the one or more processors further execute the instructions to cause the network device to:
save the first user information and the second user information into an external database shared with the at least one standby device.

10. The network device of claim 1, wherein the one or more processors further execute the instructions to cause the network device to:
send third user information to a fourth standby device of the at least one standby device, wherein the hot standby system further comprises:
a fourth active-standby relationship between the active device and the fourth standby device as to one or more third users, and wherein the third user information is used by the fourth standby device to take over the one or more third users when the active device becomes faulty.

11. The network device of claim 1, wherein the hot standby system further comprises a third active-standby relationship between another active device and a third standby device corresponding to the another active device as to one or more third users, wherein the network device further acts as the third standby device, the one or more processors further execute the instructions to cause the network device to:
receive third user information corresponding to the one or more third users sent by the another active device;

when detecting that the another active device becomes faulty, take over the one or more third users according to the third user information.

12. A network device, applied to a hot standby system comprising:
an active device, and
at least one standby device corresponding to the active device, wherein the at least one standby device comprises a first standby device and a second standby device, wherein the hot standby system comprises a load balancing relationship between the first standby device and the second standby device, a first active-standby relationship between the active device and the first standby device as to one or more first users, and a second active-standby relationship between the active device and the second standby device as to one or more second users, wherein the load balancing relationship indicates that when the active device has become faulty, the first standby device and the second standby device are responsible for taking over the one or more first users and the one or more second users respectively, and wherein the network device acts as the first standby device and comprises:
a memory comprising instructions; and
one or more processors in communicating with the memory, wherein the one or more processors execute the instructions to cause the network device to:
receive first user information corresponding to the one or more first users sent by the active device; and
when detecting that the active device becomes faulty, take over the one or more first users according to the first user information.

13. The network device of claim 12, wherein the active device comprises an active broadband network gateway (BNG), wherein the first standby device comprises a first standby BNG, and wherein the second standby device comprises a second standby BNG.

14. The network device of claim 12, wherein the first user information comprises at least one of following information: a user identity (ID), a Media Access Control (MAC) address of a user, an Internet Protocol (IP) address of the user, physical location information of the user, an access protocol attribute of the user, session information, or traffic statistics.

15. The network device of claim 12, wherein the load balancing relationship is divided based on an interface through which a user of the active device to access the active device, the one or more first users access the active device through a first interface of the active device, and the one or more second users access the active device through a second interface of the active device, and wherein the first interface is different from the second interface.

16. The network device of claim 12, wherein the hot standby system further comprises a third active-standby relationship between another active device and a third standby device corresponding to the another active device as to one or more third users, wherein the network device further acts as the another active device, the one or more processors further execute the instructions to cause the network device to:
send third user information corresponding to the one or more third users to the third standby device, wherein the third user information is used by the third standby device to take over the one or more third users when the another active device becomes faulty.

17. A hot standby method comprising:
sending, by an active device, first user information corresponding to one or more first users to a first standby device and second user information corresponding to one or more second users to a second standby device, wherein the active device belongs to a hot standby system comprising:
the active device, and
at least one standby device corresponding to the active device, wherein the at least one standby device comprises the first standby device and the second standby device, wherein the hot standby system comprises a load balancing relationship between the first standby device and the second standby device, a first active-standby relationship between the active device and the first standby device as to the one or more first users, and a second active-standby relationship between the active device and the second standby device as to the one or more second users, wherein the load balancing relationship indicates that when the active device has become faulty, the first standby device and the second standby device are responsible for taking over the one or more first users and the one or more second users respectively;
receiving, by the first standby device, the first user information from the active device;
receiving, by the second standby device, the second user information from the active device;
when detecting that the active device becomes faulty, taking over, by the first standby device, the one or more first users according to the first user information; and
when detecting that the active device becomes faulty, taking over, by the second standby device, the one or more second users according to the second user information.

18. The method of claim 17, wherein the active device comprises an active broadband network gateway (BNG), wherein the first standby device comprises a first standby BNG, and wherein the second standby device comprises a second standby BNG.

19. The method of claim 17, wherein the first user information comprises at least one of following information: a user identity (ID), a Media Access Control (MAC) address of a user, an Internet Protocol (IP) address of a user, physical location information of a user, an access protocol attribute of a user, session information, or traffic statistics.

20. The method of claim 17, wherein the load balancing relationship is divided based on an interface through which a user of the active device to access the active device, the one or more first users access the active device through a first interface of the active device, and the one or more second users access the active device through a second interface of the active device, and wherein the first interface is different from the second interface.

21. The method of claim 17, further comprising:
sending, by the active device, the first user information to a third standby device of the at least one standby device, wherein the hot standby system further comprises:
a third active-standby relationship between the active device and the third standby device as to the one or more first users,
a first priority of the first standby device, wherein the first priority indicates a priority level of taking over the one or more first users of the active device by the first standby device, and
a third priority of the third standby device, wherein the third priority indicates a priority level of taking over the one or more first users of the active device by the third standby device, and wherein the third priority is lower than the first priority.

22. The method of claim 17, further comprising:
sending, by the active device, the first user information and the second user information to a third standby device of the at least one standby device, wherein hot standby system further comprises:
a third active-standby relationship between the active device and the third standby device as to the one or more first users and the one or more second users,
a first priority of the first standby device, wherein the first priority indicates a priority level of taking over the one or more first users of the active device by the first standby device,
a second priority of the second standby device, the second priority indicates a priority level of taking over the one or more second users of the active device by the second standby device, and
a third priority of the third standby device, wherein the third priority indicates a priority level of taking over the one or more first users or the one or more second users of the active device by the third standby device, and wherein the third priority is lower than the first priority and the second priority.

23. The method of claim 17, further comprising:
saving, by the active device, the first user information and the second user information of the active device into a memory of the active device, wherein the memory of the active device is configured to store user information of the active device.

24. The method of claim 23, further comprising:
saving, by the active device, the first user information into an external database shared with the at least one standby device.

25. The method of claim 23, further comprising:
saving, by the active device, the first user information and the second user information into an external database shared with the at least one standby device.

26. The method of claim 17, further comprising:
sending, by the active device, third user information to a fourth standby device of the at least one standby device, wherein the hot standby system further comprises:
a fourth active-standby relationship between the active device and the fourth standby device as to one or more third users, and wherein the third user information is used by the fourth standby device to take over the one or more third users when the active device becomes faulty.

27. The method of claim 17, wherein the hot standby system further comprises:
a third active-standby relationship between another active device and a third standby device corresponding to the another active device as to one or more third users, wherein the first standby device further acts as the another active device, the method further comprises:
sending, by the another active, third user information corresponding to the one or more third users to the third standby device;
receiving, by the third standby device, the third user information;
when detecting that the another active device becomes faulty, taking over, by the third standby device, the one or more third users according to the third user information.

28. The method of claim 27, wherein the second standby device further acts as the third standby device.

29. The method of claim 27, wherein the active device further acts as the third standby device.

30. A hot standby system, comprising:
an active device and at least one standby device corresponding to the active device, wherein the at least one standby device comprises a first standby device and an second standby device;
wherein the active device is configured to:
send first user information corresponding to one or more first users to the first standby device, and
send second user information corresponding to one or more second users to the second standby device, wherein the hot standby system comprises a load balancing relationship between the first standby device and the second standby device, a first active-standby relationship between the active device and the first standby device as to the one or more first users, and a second active-standby relationship between the active device and the second standby device as to the one or more second users, wherein the load balancing relationship indicates that when the active device has become faulty, the first standby device and the second standby device are responsible for taking over the one or more first users and the one or more second users respectively;
wherein the first standby device is configured to:
receive the first user information_from the active device;
when detecting that the active device becomes faulty, take over the one or more first users according to the first user information;
wherein the second standby device is configured to:
receive the second user information_from the active device;
when detecting that the active device becomes faulty, take over the one or more second users according to the second user information.

31. The hot standby system of claim 30, wherein the active device comprises an active broadband network gateway (BNG), wherein the first standby device comprises a first standby BNG, and wherein the second standby device comprises a second standby BNG.

32. The hot standby system of claim 30, wherein the first user information comprises at least one of following information: a user identity (ID), a Media Access Control (MAC) address of a user, an Internet Protocol (IP) address of the user, physical location information of the user, an access protocol attribute of the user, session information, or traffic statistics.

33. The hot standby system of claim 30, the load balancing relationship is divided based on an interface through which a user of the active device to access the active device, the one or more first users access the active device through a first interface of the active device, and the one or more second users access the active device through a second interface of the active device, and wherein the first interface is different from the second interface.

34. The hot standby system of claim 30, wherein the active device is further configured to:
send the first user information to a third standby device of the at least one standby device, wherein the hot standby system further comprises:
a third active-standby relationship between the active device and the third standby device as to the one or more first users, a first priority of the first standby device, wherein the first priority indicates a priority level of taking over the one or more first users of the active device by the first standby device, and a third priority of the third standby device, wherein the third priority indicates a priority level of taking over the one or more first users of the active device by the third standby device, and wherein the third priority is lower than the first priority.

35. The hot standby system of claim 30, wherein the active device is further configured to:

send the first user information and the second user information to a third standby device of the at least one standby device, wherein hot standby system further comprises:

a third active-standby relationship between the active device and the third standby device as to the one or more first users and the one or more second users, a first priority of the first standby device, wherein the first priority indicates a priority level of taking over the one or more first users of the active device by the first standby device, a second priority of the second standby device, the second priority indicates a priority level of taking over the one or more second users of the active device by the second standby device, and a third priority of the third standby device, wherein the third priority indicates a priority level of taking over the one or more first users or the one or more second users of the active device by the third standby device, and wherein the third priority is lower than the first priority and the second priority.

36. The hot standby system of claim 30, wherein the active device is further configured to:

save the first user information and the second user information of the active device into a memory of the active device, wherein the memory of the active device is configured to store user information of the active device.

37. The hot standby system of claim 36, wherein the active device is further configured to:

save the first user information into an external database shared with the at least one standby device.

38. The hot standby system of claim 36, wherein the active device is further configured to:

save the first user information and the second user information into an external database shared with the at least one standby device.

39. The hot standby system of claim 30, wherein the active device is further configured to:

send third user information to a fourth standby device of the at least one standby device, wherein the hot standby system comprises further comprises: a fourth active-standby relationship between the active device and the fourth standby device as to one or more third users, and wherein the third user information is used by the fourth standby device to take over the one or more third users when the active device becomes faulty.

40. The hot standby system of claim 30, further comprising a third active-standby relationship between another active device and a third standby device corresponding to the another active device as to one or more third users, wherein the first standby device further acts as the another active device, wherein the another active device is further configured to:

send third user information corresponding to the one or more third users to the third standby device;

wherein the third standby device is further configured to:

receive the third user information;

when detecting that the another active device becomes faulty, take over the one or more third users according to the third user information.

41. The hot standby system of claim 40, wherein the second standby device further acts as the third standby device.

42. The hot standby system of claim 40, wherein the active device further acts as the third standby device.

43. A non-transitory computer-readable medium having instructions stored therein, which when executed by a processor, cause the processor to:

send first user information corresponding to one or more first users to a first standby device and send second user information corresponding to one or more second users to a second standby device, wherein the hot standby system comprises:

the active device, and at least one standby device corresponding to the active device, wherein the at least one standby device comprises the first standby device and the second standby device, wherein the hot standby system comprises a load balancing relationship between the first standby device and the second standby device, a first active-standby relationship between the active device and the first standby device as to the one or more first users, and a second active-standby relationship between the active device and the second standby device as to the one or more second users, wherein the load balancing relationship indicates that when the active device has become faulty, the first standby device and the second standby device are responsible for taking over the one or more first users and the one or more second users respectively; wherein the first user information is used by the first standby device to take over the one or more first users when the active device becomes faulty, and wherein the second user information is used by the second standby device to take over the one or more second users when the active device becomes faulty.

* * * * *